US012212065B2

(12) United States Patent
Sakurai et al.

(10) Patent No.: US 12,212,065 B2
(45) Date of Patent: Jan. 28, 2025

(54) BROADBAND PLANAR ARRAY ANTENNA

(71) Applicant: DENSO CORPORATION, Kariya (JP)

(72) Inventors: Kazumasa Sakurai, Nisshin (JP); Kazushi Kawaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 121 days.

(21) Appl. No.: 17/647,426

(22) Filed: Jan. 7, 2022

(65) Prior Publication Data

US 2022/0131278 A1 Apr. 28, 2022

Related U.S. Application Data

(63) Continuation of application No. PCT/JP2020/027075, filed on Jul. 10, 2020.

(30) Foreign Application Priority Data

Jul. 11, 2019 (JP) ................................ 2019-129231

(51) Int. Cl.
*H01Q 21/20* (2006.01)
*H01Q 21/06* (2006.01)

(52) U.S. Cl.
CPC ........... *H01Q 21/065* (2013.01); *H01Q 21/20* (2013.01)

(58) Field of Classification Search
CPC .... H01Q 21/065; H01Q 21/20; H01Q 1/3233; H01Q 13/206; H01Q 1/38; H01Q 21/08
See application file for complete search history.

(56) References Cited

U.S. PATENT DOCUMENTS 6,424,298 B1 * 7/2002 Nishikawa ........... H01Q 21/065 343/700 MS
8,912,960 B1 * 12/2014 Andrenko ................ H01Q 1/38 343/895
9,705,199 B2 * 7/2017 Apostolos ................ H01Q 3/34
2005/0264451 A1 * 12/2005 Aikawa ................ H01Q 21/065 343/700 MS
2010/0026584 A1 * 2/2010 Nakabayashi ....... H01Q 21/065 343/893
2019/0067834 A1 * 2/2019 Park ....................... H01Q 5/385

FOREIGN PATENT DOCUMENTS

JP 2002084126 A 3/2002
JP 2015-091059 A 5/2015

* cited by examiner

*Primary Examiner* — Minh D A
(74) *Attorney, Agent, or Firm* — Maschoff Brennan

(57) ABSTRACT

A broadband planar array antenna in one aspect of the present disclosure includes: a multi-layer board; a plurality of patch antenna patterns; and a transmission line that connects the plurality of patch antenna patterns in series. The distance from the transmission line to an end of each of the plurality of patch antenna patterns along the polarization direction of a radiated radio wave is shorter with increasing proximity to a feeding point of the transmission line.

6 Claims, 19 Drawing Sheets

4GHz FREQUENCY BAND

DISTANCE RESOLUTION 4cm 0.5GHz FREQUENCY BAND

DISTANCE RESOLUTION 30cm

BROADBAND PLANAR ARRAY ANTENNA

CROSS-REFERENCE TO RELATED APPLICATION

This application is the U.S. bypass application of International Application No. PCT/JP2020/027075 filed on Jul. 10, 2020 which designated the U.S. and claims priority to Japanese Patent Application No. 2019-129231, filed on Jul. 11, 2019, the contents of both of which are incorporated herein by reference.

TECHNICAL FIELD

The present disclosure relates to broadband planar array antenna technologies.

BACKGROUND

The antenna device described in JP 2015-91059 A shown below includes a first ground layer, a second ground layer, a third ground layer, and a plurality of patch antennas arrayed and separated from the first ground layer, an antenna feeder line between the first ground layer and the second ground layer, and a routing feeder line between the second ground layer and the third ground layer. The antenna device extends the frequency band by increasing the separation distance between the first ground layer and the second ground layer.

SUMMARY

One aspect of the present disclosure is a broadband planar array antenna that includes a multi-layer board, a plurality of patch antenna patterns, and a transmission line. The multi-layer board has dielectric layers and conductor pattern layers alternately laminated. The plurality of patch antenna patterns is provided on at least one of the conductor pattern layers. The transmission line connects the plurality of patch antenna patterns in series. Each of the plurality of patch antenna patterns is configured such that the distance from the transmission line to an end of each of the plurality of patch antenna patterns along a polarization direction of a radiated radio wave is shorter with increasing proximity to a feeding point of the transmission line.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

As the result of detailed examination, the inventor found an issue that applying the antenna device described in JP 2015-91059 A to transmission of broadband signals would cause shifts in the phase of power feeding to the patch antennas due to frequency differences because the electrical length is different among the individual frequencies of the signals. In particular, the inventor found an issue of the shift in the power feeding phase becoming large between the ends of the frequency band, bringing about a decrease in the gain of the array antenna.

In one aspect of the present disclosure, there is desirably provided a broadband planar array antenna that can suppress phase shifts in the power feeding to patch antennas due to frequency differences.

One aspect of the present disclosure is a broadband planar array antenna that includes a multi-layer board, a plurality of patch antenna patterns, and a transmission line. The multi-layer board has dielectric layers and conductor pattern layers alternately laminated. The plurality of patch antenna patterns is provided on at least one of the conductor pattern layers. The transmission line connects the plurality of patch antenna patterns in series. Each of the plurality of patch antenna patterns is configured such that the distance from the transmission line to an end of each of the plurality of patch antenna patterns along a polarization direction of a radiated radio wave is shorter with increasing proximity to a feeding point of the transmission line.

According one aspect of the present disclosure, each of the plurality of patch antenna patterns is configured such that the distance from the transmission line to the end of the patch antenna pattern along the polarization direction is shorter with increasing proximity to the feeding point. Thus, in each of the plurality of patch antenna patterns, a high-frequency component of a broadband signal supplied to the transmission line with a relatively short electrical length is likely to resonate at a position relatively close to the feeding point. That is, the frequency component of a broadband signal with a shorter electrical length is more likely to resonate at a position close to the feeding point. This generates a resonance position difference in each of the plurality of patch antenna patterns in accordance with frequency differences, and the shift in the power feeding phase is corrected by the resonance position difference. Therefore, it is possible to suppress the shift in the phase of power fed to each of the plurality of patch antenna patterns due to the frequency difference, thereby suppressing a decrease in the gain of the array antenna.

Hereinafter, embodiments for carrying out the present disclosure will be described with reference to the drawings.

First Embodiment

1-1. Overall Configuration

Figure 1:
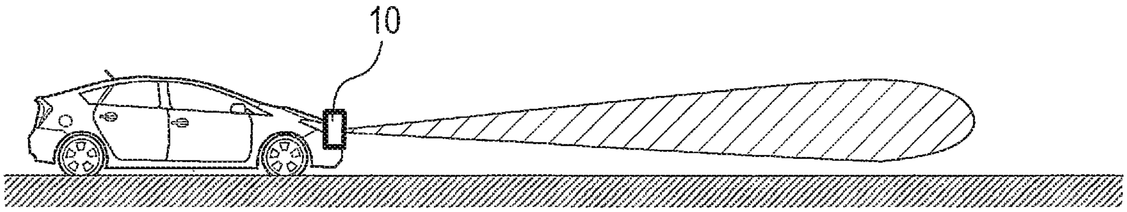
FIG. 1 is a diagram illustrating an in-vehicle radar device according to a first embodiment.

FIG. 1 illustrates a radar device 10 mounted on a vehicle according to the present embodiment. The radar device 10 is a millimeter wave radar that detects other vehicles and objects such as pedestrians present around the own vehicle. The radar device 10 is mounted, for example, on the right and left of the front part of the vehicle or on the right and left of the rear part of the vehicle.

A modulation method adopted in the radar device 10 may be FMCW method, 2FCW method, or the like. If any of the modulation methods is used in the radar device 10, the radar device 10 has a higher distance resolution in a wider frequency band. With a higher distance resolution, the radar device 10 can detect separately more objects present within a close range.

Figure 2:
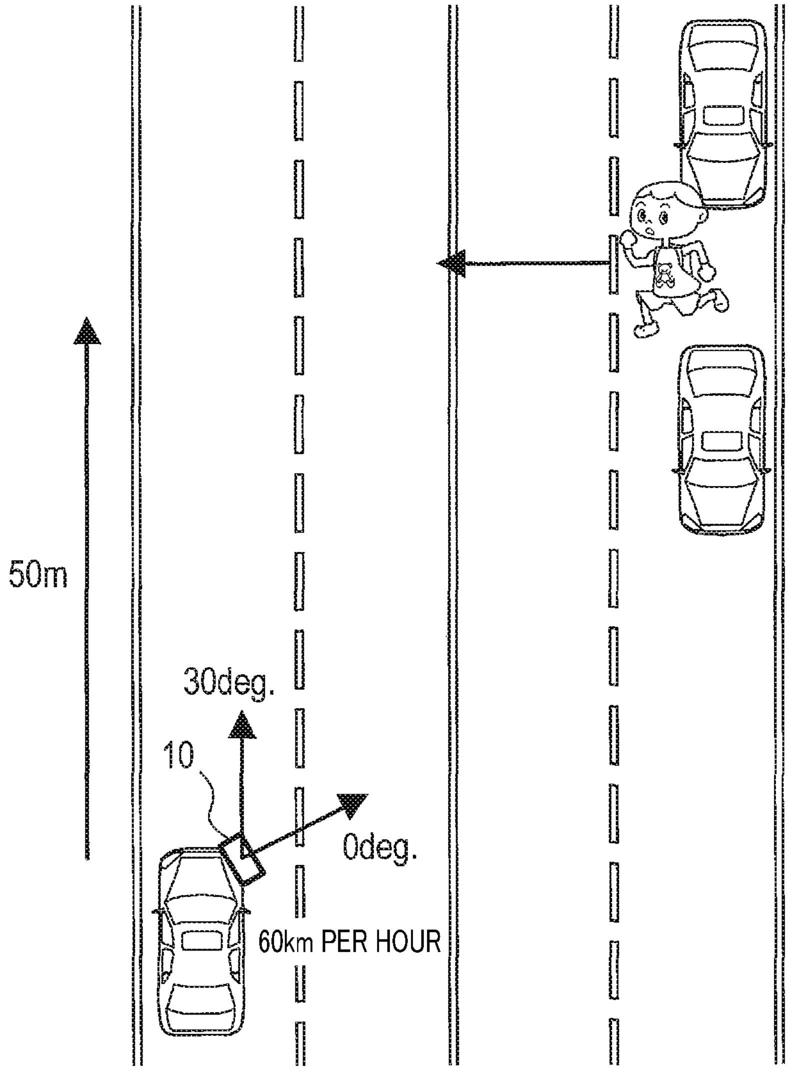
FIG. 2 is a diagram illustrating an observation target of the radar device according to the first embodiment.
Figure 3:
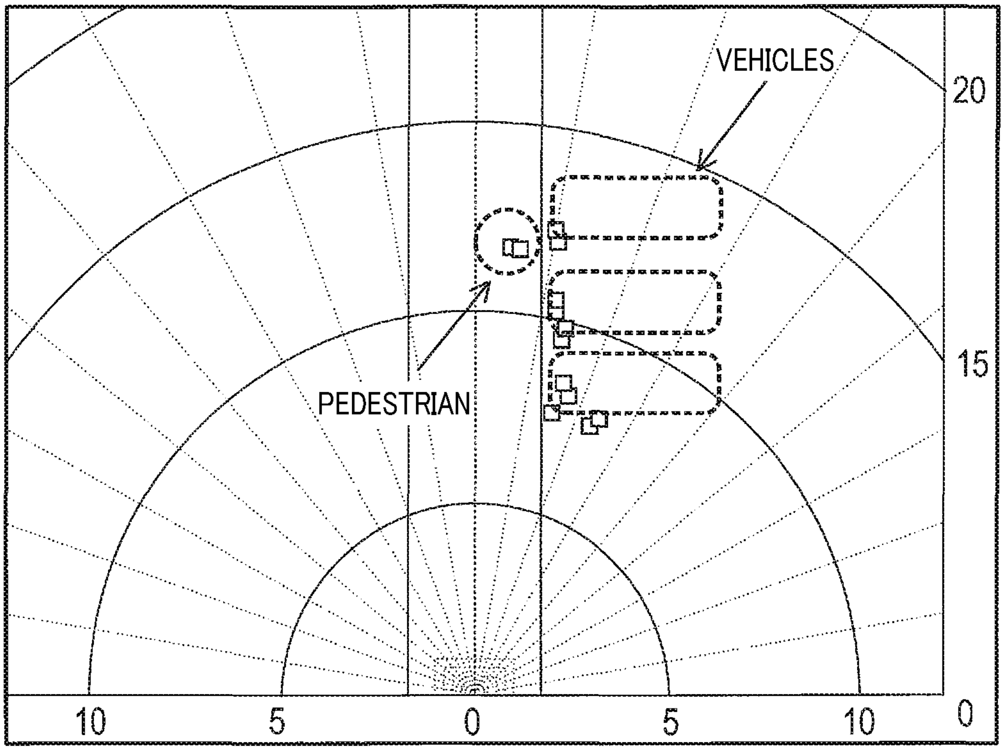
FIG. 3 is a diagram illustrating the frequency coverage and distance resolution of a broadband radar and detectable targets.
Figure 4:
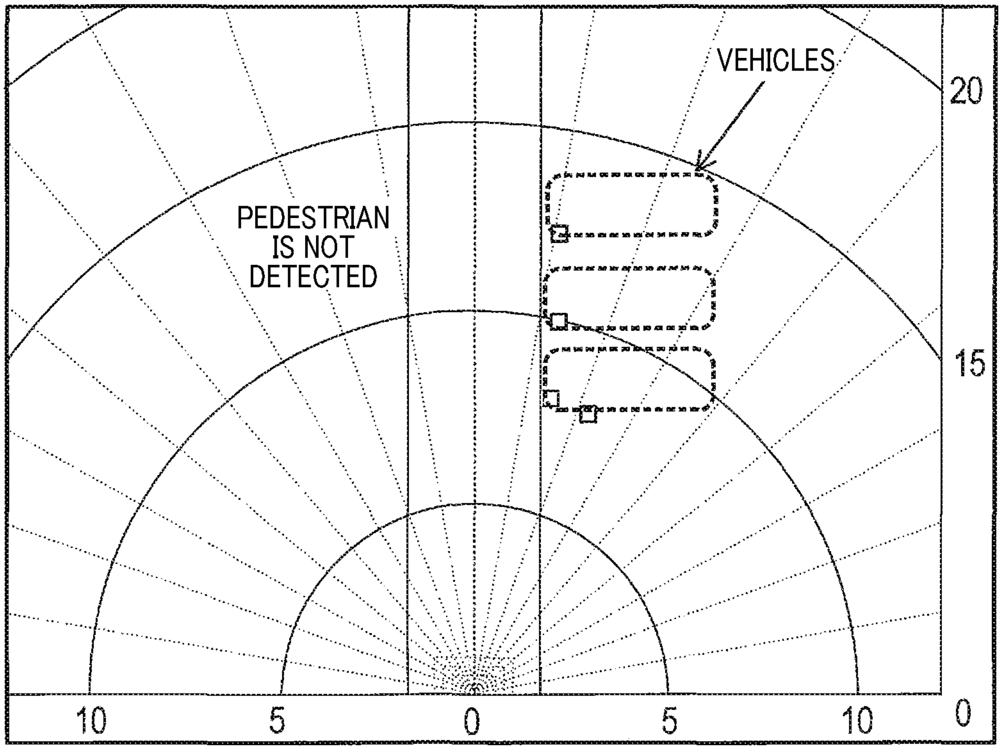
FIG. 4 is a diagram illustrating the frequency coverage and distance resolution of a narrowband radar and detectable targets.

For example, as illustrated in FIG. 2, a situation will be considered in which a pedestrian runs out between other vehicles 50 m ahead of the radar device 10. As illustrated in FIG. 3, if the frequency band covered by the radar device 10 is 4 GHz, the radar device 10 has a distance resolution of 4 cm and thus can detect separately the pedestrian and the other vehicles near the pedestrian. On the other hand, as illustrated in FIG. 4, if the frequency band covered by the radar device 10 is 0.5 GHz, the radar device 10 has a distance resolution of 30 cm and thus does not detect the pedestrian separately from the nearby other vehicles.

Accordingly, in order to realize brake control for the pedestrian having run out between the other vehicles present 50 m ahead of the radar device 10, the radar device 10 is desirably a broadband radar device. Thus, the radar device 10 according to the present embodiment is configured as a broadband millimeter wave radar. Specifically, in the present embodiment, the frequency band covered by the radar device 10 is 5 GHz from 76 to 81 GHz.

The radar device 10 internally includes an antenna board on which a plurality of broadband planar array antennas (hereinafter, called array antennas) 21 is aligned and arranged. The array antennas 21 radiate radio waves with power feeding of broadband high-frequency signals.

1-2. Configuration of Array Antenna

Figure 5:
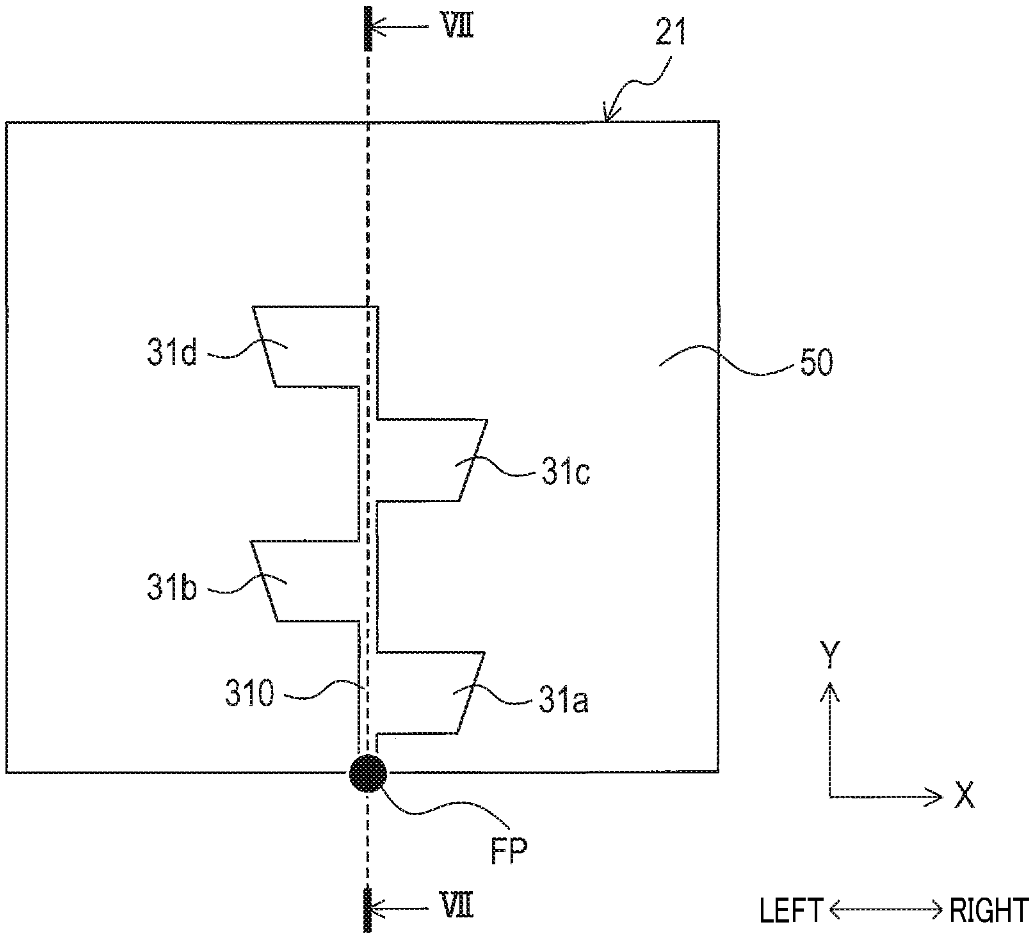
FIG. 5 is a plan view of a configuration of an array antenna according to the first embodiment.
Figure 6:
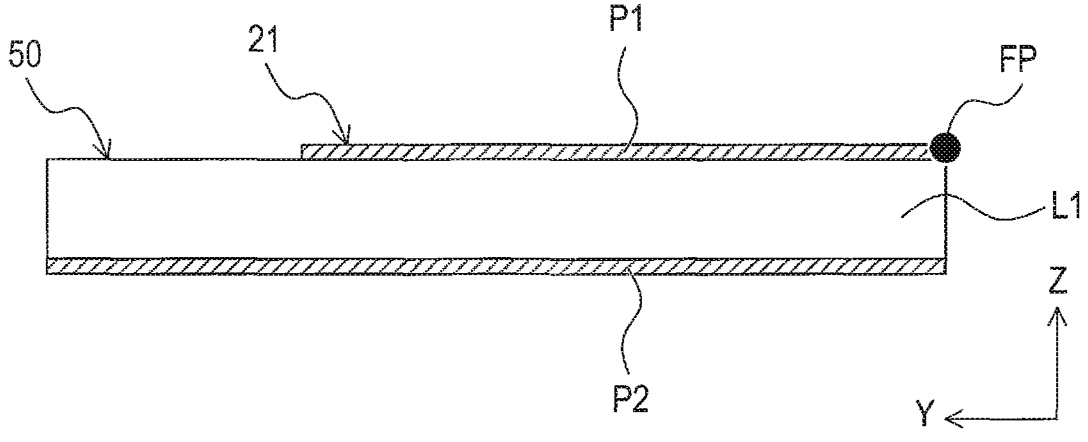
FIG. 6 is a cross-sectional view of FIG. 5 taken along line VII-VII.

Next, a configuration of each array antenna 21 according to the present embodiment will be described with reference to FIGS. 5 and 6. The array antenna 21 includes a multi-layer board 50. The multi-layer board 50 has a dielectric layer and conductor pattern layers alternately laminated. In the present embodiment, the multi-layer board 50 has one electric layer L1 and two conductor pattern layers P1 and P2 sandwiching the dielectric layer L1.

The conductor pattern layer P1 has four patch antenna patterns (hereinafter, called patch antennas) 31*a*, 31*b*, 31*c*, and 31*d*, and a transmission line 310.

The transmission line 310 is a microstrip line that transmits broadband high-frequency signals and connects the four patch antennas 31*a*, 31*b*, 31*c*, and 31*d* in series in this order. A feeding point FP is provided at the end of the transmission line 310 facing the patch antenna 31*a*. In the present embodiment, the propagation direction of a high-frequency signal, that is, the extension direction of the transmission line 310 will be called Y-axis direction, and the direction vertical to the extension direction of the transmission line 310 will be called as X-axis direction. The lamination direction of the multi-layer board 50 will be called Z-axis direction. In the X-axis direction, the right side of the plane of paper will be called right side, and the left side of the plane of paper will be called left side. The radar device 10 is mounted on the vehicle such that the Y-axis direction is the height direction of the vehicle.

The patch antennas 31*a*, 31*b*, 31*c*, and 31*d* are arranged at positions further from the feeding point FP in order from the patch antenna 31*a*. The patch antennas 31*a* and 31*c* are connected to the right side of the transmission line 310, and the patch antennas 31*b* and 31*d* are connected to the left side of the transmission line 310. That is, the path antennas 31*a*, 31*b*, 31*c*, and 31*d* are alternately arranged to right and left with respect to the transmission line 310 in the Y-axis direction. Hereinafter, the patch antennas 31*a*, 31*b*, 31*c*, and 31*d* will be collectively called patch antennas 31.

The four patch antennas 31 are arranged in the Y-axis direction at intervals of ½ of a designed wavelength λo such that the power feeding phases of the patch antennas 31 are equal at a designed frequency fo. That is, the patch antennas 31*a* and 31*c* are arranged on the right side of the transmission line 310 at an interval of the designed wavelength λo, and the patch antennas 31*b* and 31*d* are arranged on the left side of the transmission line 310 at the interval of the designed wavelength λo. The designed frequency fo is a predetermined frequency included in the frequency band of a high-frequency signal. The designed wavelength λo is an effective wavelength corresponding to the designed frequency fo. In the present embodiment, the designed frequency fo is set to a frequency of 76 GHz at an end of the frequency band.

The high-frequency signal supplied to the feeding point FP of the transmission line 310 propagates through the transmission line 310 and is supplied to the patch antennas 31*a*, 31*b*, 31*c*, and 31*d*. Then, the patch antennas 31*a*, 31*b*, 31*c*, and 31*d* radiate radio waves. In the present embodiment, the polarization direction of a radiated radio wave is preset to the X-axis direction. That is, the polarization angle formed by the polarization direction of a radiated radio wave and the transmission line 310 is set to 90°.

Each patch antenna 31 is configured such that the distance from the transmission line 310 to the end of the patch antenna 31 along the polarization direction of the radiated radio wave is shorter with increasing proximity to the feeding point FP. The distance along the polarization direction is a distance as seen in the X-axis direction.

Specifically, each patch antenna 31 is formed in the shape of a trapezoid with a first side and a second side in parallel along the X-axis direction. The first side is the longest side of the patch antenna 31. The second side is closer to the feeding point FP than the first side. The patch angle formed by the first side, the second side, and the transmission line 310 is 90°.

The high-frequency signal having propagated through each patch antenna 31 flows along the first side that is the longest side. That is, the patch antennas 31 are configured such that the high-frequency signal flows along the polarization direction of a radiated radio wave.

Figure 7:
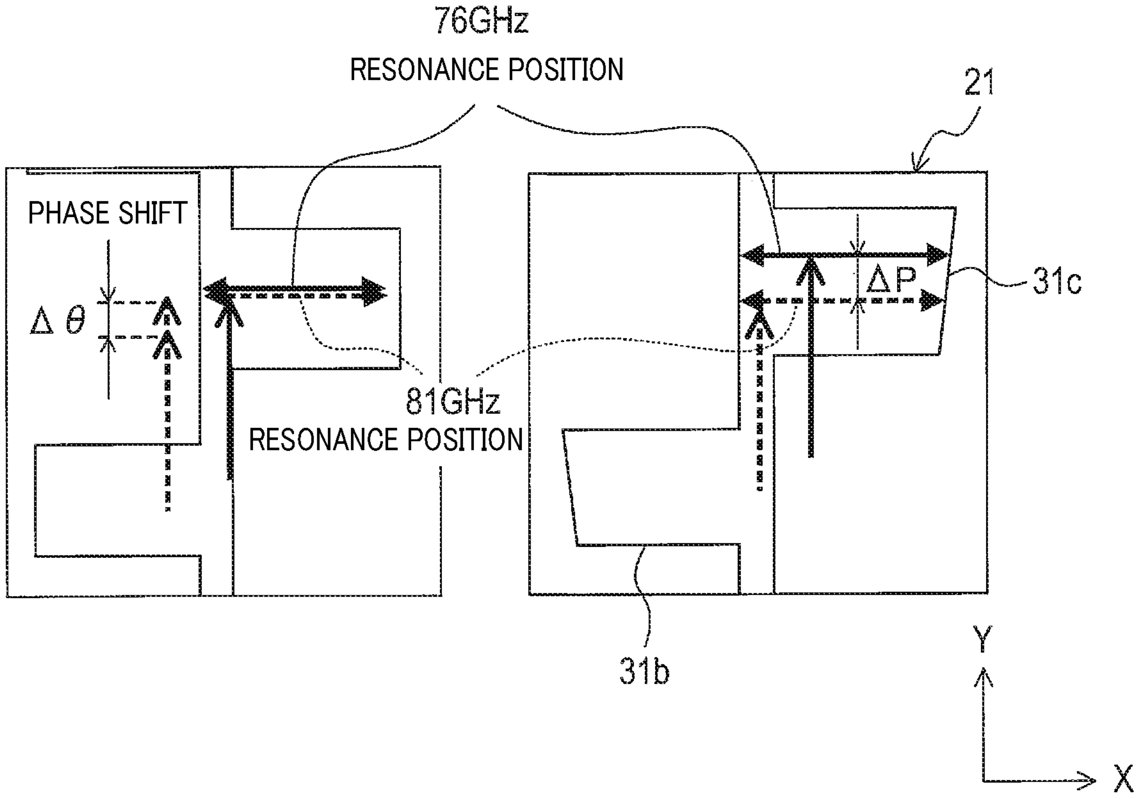
FIG. 7 is a diagram illustrating a shift in power feeding phase due to a frequency difference in a rectangular patch antenna and correction of a shift in power feeding phase in a trapezoidal patch antenna.

As illustrated at the left side of FIG. 7, it is assumed that an array antenna includes rectangular patch antennas. Each patch antenna is configured such that the length of the long side is equal to the designed wavelength λo. In this case, the broadband high-frequency signal resonates around the center of each patch antenna as seen in the Y-axis direction. That is, in each path antenna, all high-frequency signals included in the broadband resonate at the same position. However, the broadband high-frequency signals differ in wavelength from frequency to frequency. Thus, the phase of power feeding is different at the resonance position from frequency to frequency. That is, there occurs a phase shift Δθ at the resonance position between the power feeding phase of a high-frequency signal at 81 GHz and the power feeding phase of a high-frequency signal at 76 GHz. As a result, if such array an antenna is applied to transmission of broadband high-frequency signals, the array antenna will provide a decreased gain.

On the other hand, as illustrated at the right side of FIG. 7, the patch antennas 31 according to the present embodiment are formed in a trapezoidal shape. More specifically, the length of a first side of the trapezoid is equal to or longer than an effective wavelength of a highest-frequency component of a broadband high-frequency signal. The length of a second side of the trapezoid is equal to or shorter than an effective wavelength of a lowest-frequency component of a broadband high-frequency signal.

Thus, in each patch antenna 31, the broadband high-frequency signal resonates in accordance with a frequency at a position where the distance as seen in the X-axis direction along the polarization direction is close to a half wavelength. That is, in each patch antenna 31, a broadband high frequency signal with a higher frequency and shorter wavelength resonates at a position closer to the feeding point FP. Accordingly, each patch antenna 31 has a resonance position difference ΔP between a resonance position at 81 GHz and a resonance position at 76 GHz as seen in the extension direction of the transmission line 310.

The resonance position difference ΔP corrects the difference between the power feeding phase at 81 GHz and the power feeding phase at 76 GHz. That is, the phase shift θ in the power feeding phase among the frequency components included in broadband high-frequency signals are suppressed. As a result, even if the array antenna 21 is applied to transmission of broadband high-frequency signals, a decrease in the gain of the array antenna 21 is suppressed.

1-3. Advantageous Effects

According to the first embodiment described above, the following advantageous effects can be obtained.

(1) Each patch antenna 31 is configured such that the distance from the transmission line 310 to the end along the polarization direction is shorter with increasing proximity to the feeding point FP. Thus, in each patch antenna 31, the signal component included in a broadband high-frequency signal is likely to resonate at a position close to the feeding point FP as the signal has a higher frequency and a longer electrical length. As a result, the resonance position difference ΔP occurs in accordance with the frequency difference among the broadband high-frequency signals, and the resonance position difference ΔP corrects the phase shift Δθ in the power feeding phase. Therefore, it is possible to suppress the phase shifts Δθ in the phase of power feeding to the patch antenna patterns 31 due to frequency differences, thereby suppressing a decrease in the gain of the array antenna 21.

(2) A high-frequency signal is likely to propagate in each patch antenna 31 in a direction in which the distance from the transmission line 310 to the end is the longest. Setting the patch angle formed by the longest side and the transmission line 310 to 90° allows the high-frequency signal to propagate along the longest side more reliably than in the case of setting the patch angle to less than 90°. Accordingly, it is possible to design the array antenna 21 appropriately so as to correct the phase shifts Δθ in the power feeding phase by the resonance position differences ΔP.

Second Embodiment

2-1. Differences from the First Embodiment

A second embodiment is similar in basic components to the first embodiment, and thus duplicated description of the common components will be omitted and differences will be mainly described. The same reference signs as those in the first embodiment denote identical components, and thus the preceding description will be referred to.

The array antenna 21 in the first embodiment described above include the plurality of patch antennas 31 of the same shape. Differently from the first embodiment, an array antenna 22 in the second embodiment includes a plurality of patch antennas 32 of different shapes.

2-2. Configuration of Array Antennas

Figure 8:
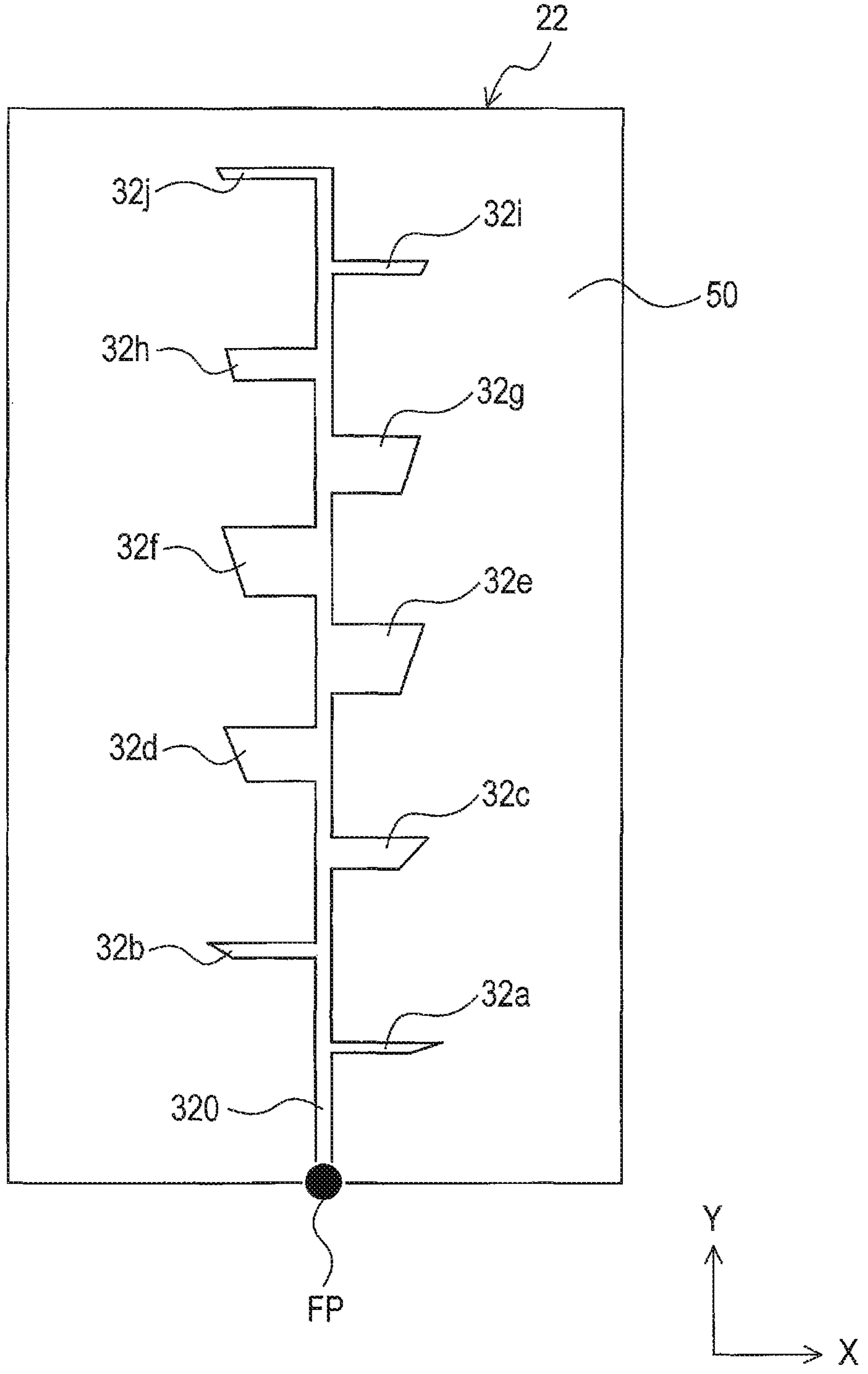
FIG. 8 is a plan view of a configuration of an array antenna according to a second embodiment.

Next, a configuration of the array antenna 22 according to the present embodiment will be described with reference to FIGS. 8 and 9. The array antenna 22 includes a multi-layer board 50. The multi-layer board 50 has patch antennas 32*a*, 32*b*, 32*c*, 32*d*, 32*e*, 32*f*, 32*g*, 32*h*, 32*i*, and 32*j* and a transmission line 320 formed on a conductor pattern layer P1. Hereinafter, the patch antennas 32*a*, 32*b*, 32*c*, 32*d*, 32*e*, 32*f*, 32*g*, 32*h*, 32*i*, and 32*j* will be collectively called patch antennas 32.

The transmission line 320 is a microstrip line that transmits broadband high-frequency signals and extends in a Y-axis direction. The transmission line 320 connects the ten patch antennas 32 in series.

The ten patch antennas 32 are arranged at intervals of ½ of a designed wavelength λo in order from the patch antenna 32*a*, from the feeding point FP provided at a first end of the transmission line 320 to a second end of the transmission line 320. The second end is opposite to the first end. The patch antennas 32*a*, 32*c*, 32*e*, 32*g*, and 32*i* are connected in this order to the right side of the transmission line 320, and the patch antennas 32*b*, 32*d*, 32*f*, 32*h*, and 32*j* are connected in this order to the left side of the transmission line 320. In the present embodiment, the designed frequency fo is set to 78.5 GHz that is the center frequency of the frequency band.

Each patch antenna 32 is formed in a trapezoidal shape with a first side and a second side in parallel along the X-axis direction. The first side is the longest side of the patch antenna 32. The second side is closer to the feeding point FP than the first side. The patch angle formed by the first side, the second side, and the transmission line 320 is 90°. In the present embodiment, the polarization angle formed by the polarization direction of a radiated radio wave and the transmission line 320 is set in advance to 90°, that is, the polarization direction is the X-axis direction. Accordingly, like the patch antennas 31, the patch antennas 32 are configured such that a high-frequency signal flows along the polarization direction of a radiated radio wave. In addition, like the patch antennas 31, each patch antenna 32 is configured such that the distance from the transmission line 320 to the end of the patch antenna 32 along the polarization direction of a radiated radio wave is shorter with increasing proximity to the feeding point FP.

The sizes of the patch antennas 31 (that is, the area of the patches) are all the same, whereas the sizes of the patch antennas 32 are not all the same. In the present embodiment, in order to provide the array antenna 22 with directivity, the sizes of the patch antennas are made different. Specifically, the middle patch antennas 32*e* and 32*f* are largest in size in order to increase the forward directivity of the array antenna 22. The patch antennas 32 are smaller in size in a direction from the patch antenna 32*e* toward the patch antenna 32*a* at the first end. In addition, the patch antennas 32 are smaller in sizes in a direction from the patch antenna 32*f* toward the path antenna 32*j* at the second end. That is, the patch antennas 32*e* and 32*f* are widest, and the patch antennas 32 are narrower in directions toward the first end and the second end. The widths of the patch antennas 32 are lengths as seen in the Y-axis direction.

The patch antennas 31 are all identical in the angle formed by two non-parallel sides of the trapezoid. In contrast, the patch antennas 32 are different in the non-parallel angle formed by two non-parallel sides of the trapezoid. Specifically, the patch antennas 32 closer to the feeding point FP (that is, the first end) have larger distance change amounts ΔD. The distance herein refers to a distance from the transmission line 320 to the end of the patch antenna 32 along the polarization direction. The change amount herein refers to the amount of a change in the distance in a direction vertical to the polarization direction (that is, the Y-axis direction).

That is, each patch antenna 32 is configured such that the angle formed by the two non-parallel sides of the trapezoid is larger with increasing proximity to the feeding point FP. One of the two non-parallel sides is connected to the transmission line 320 and parallel to the transmission line 320. The remaining one of the two non-parallel sides opposes the side parallel to the transmission line 320.

The distance change amount ΔD of each patch antenna 32 constitutes a difference between the first side and the second side with respect to the width of the patch antennas 32 as seen in the Y-axis direction. As illustrated in FIG. 9, the change amount ΔD=ΔX1/ΔY1 is larger than the change amount ΔD=ΔX2/ΔY2. The change amount ΔD=ΔX1/ΔY1 constitutes the distance change amount of the patch antenna 32*c*, and the distance change amount ΔD=ΔX2/ΔY2 constitutes the distance change amount of the patch antenna 32*h* that is further from the feeding point FP than the path antenna 32*c*.

The phase shifts Δθ in the power feeding phase in accordance with the frequency differences Δf among high-frequency signals are larger with decreasing proximity to the feeding point FP. Thus, the phase shifts Δθ are desirably corrected by increasing the resonance position differences ΔP in accordance with the frequency differences with decreasing proximity to the feeding point FP.

Figure 9:
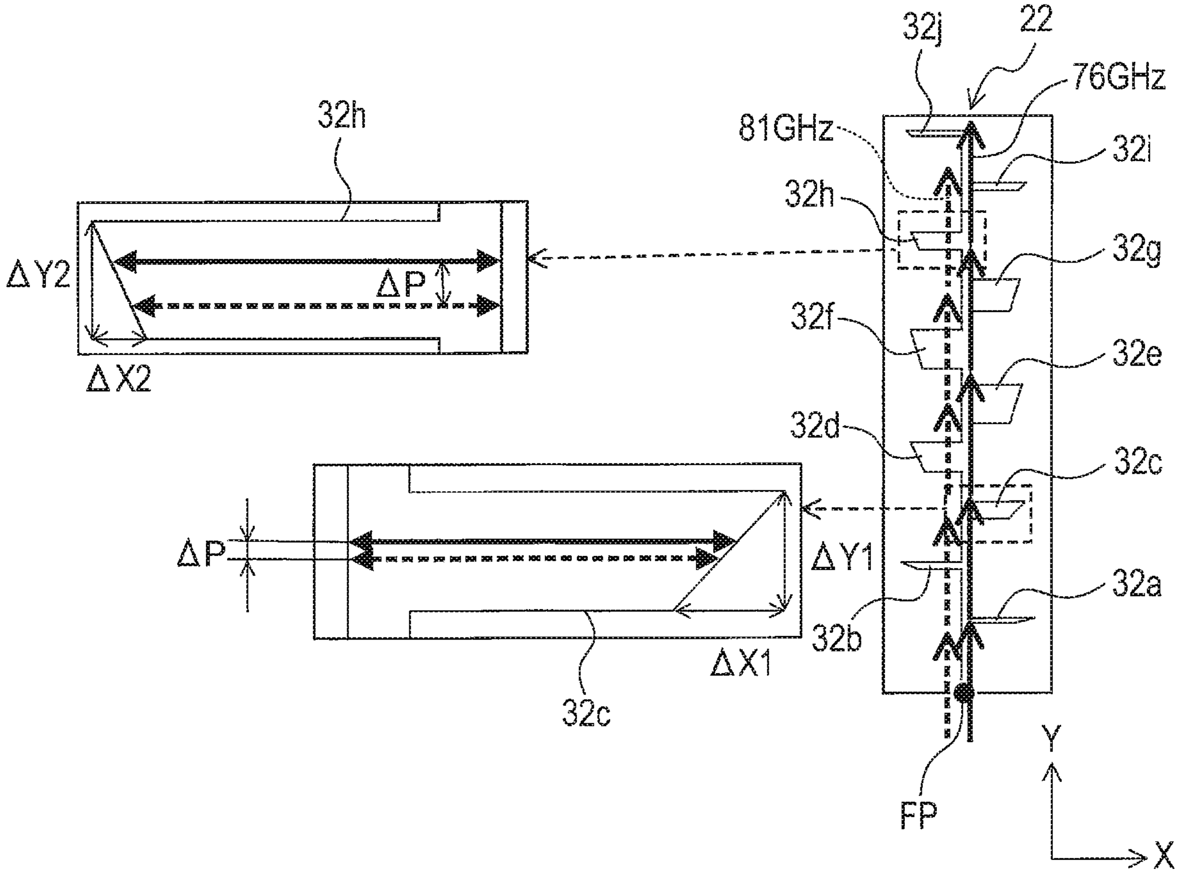
FIG. 9 is a diagram illustrating differences in trapezoidal shape among patch antennas in accordance with distances from a feeding point, in the array antenna according to the second embodiment.

As illustrated in FIG. 9, if the frequency differences Δf among high-frequency signals are uniform, the larger the distance change amounts ΔD of the patch antennas 32, the smaller the resonance position differences ΔP are. That is, configuring the patch antennas 32 to have smaller distance change amounts ΔD at larger distances from the feeding point FP makes the resonance position differences ΔP larger in accordance with the frequency difference Δf at larger distances from the feeding point FP. As a result, the phase shifts Δθ can be favorably corrected by the resonance position differences ΔP.

2-3. Operations

Figure 10:
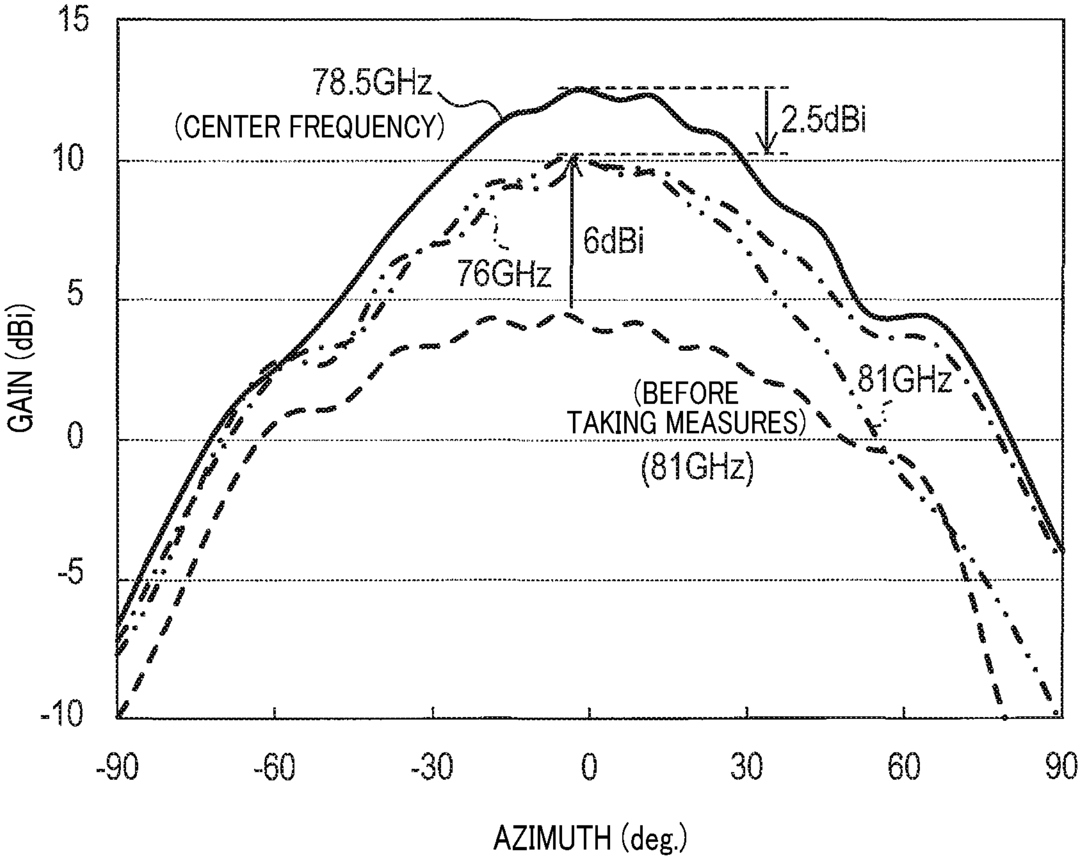
FIG. 10 is a graph illustrating horizontal antenna gains with respect to the azimuths of the array antenna according to the second embodiment.

FIG. 10 illustrates horizontal antenna gains at 76 GHz, 78.5 GHz, and 81 GHz according to the present embodiment, and horizontal antenna gains at 81 GHz before taking measures against phase shift. The horizontal antenna gains refer to gains in an XZ plane taken along the middle of the array antenna 22 as seen in the Y-axis direction. The azimuths are represented by the angle in the XZ plane centered on the front side of the array antenna 22.

As illustrated in FIG. 10, in the present embodiment, the decreases in the antenna gains at 76 GHz and 81 GHz that are frequencies at band ends with respect to the antenna gains at the designed frequency 78.5 GHz are within 2.5 dBi. In contrast, the decreased of the antenna gains at 81 GHz before taking measures against phase shift with respect to the antenna gains at the designed frequency of 78.5 GHz are 6 dBi that is more twice the decreases in the present embodiment.

Figure 11:
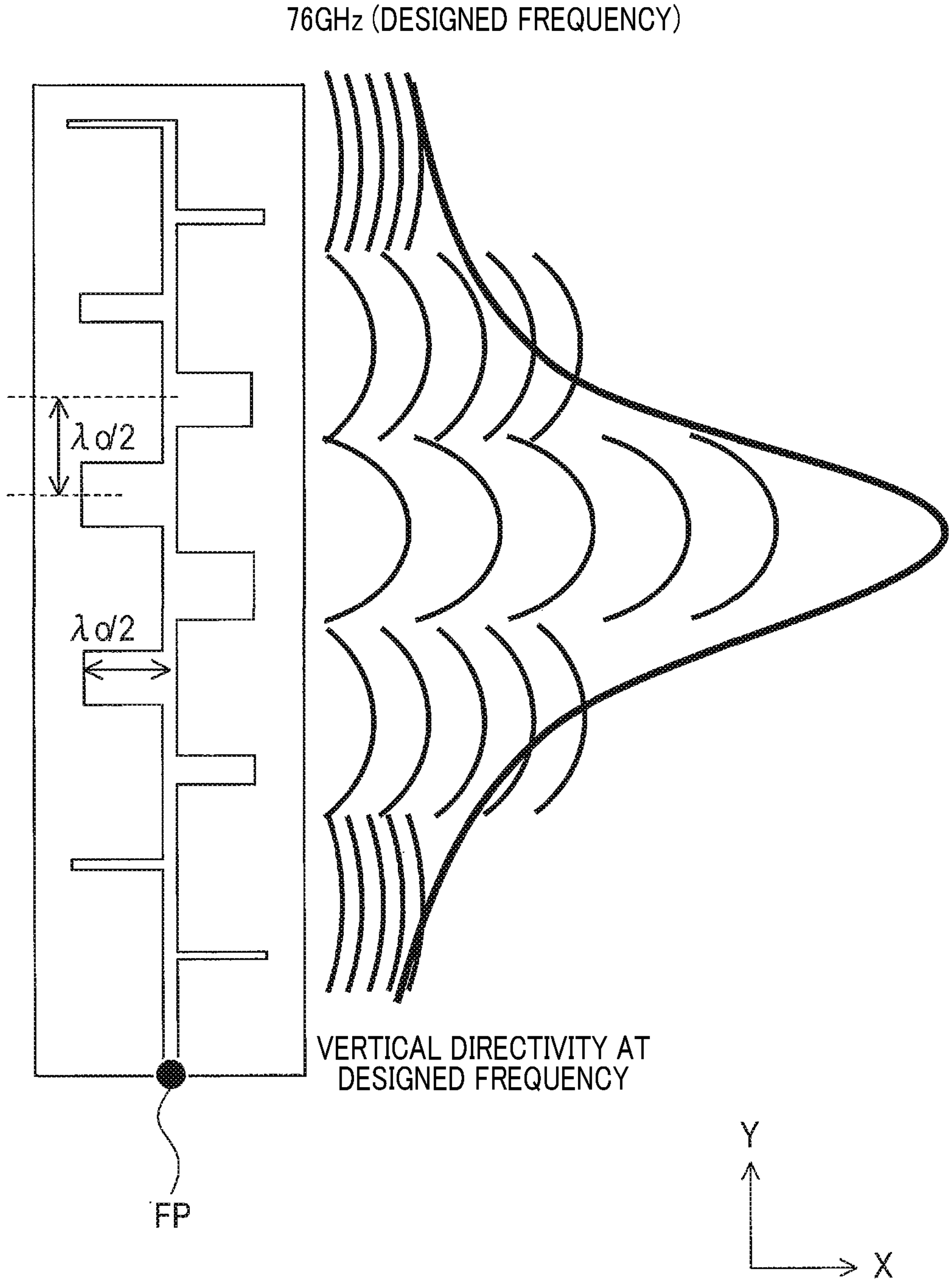
FIG. 11 is a diagram illustrating an array antenna with an array of rectangular patch antennas and vertical directivity of the array antenna at a designed frequency.
Figure 12:
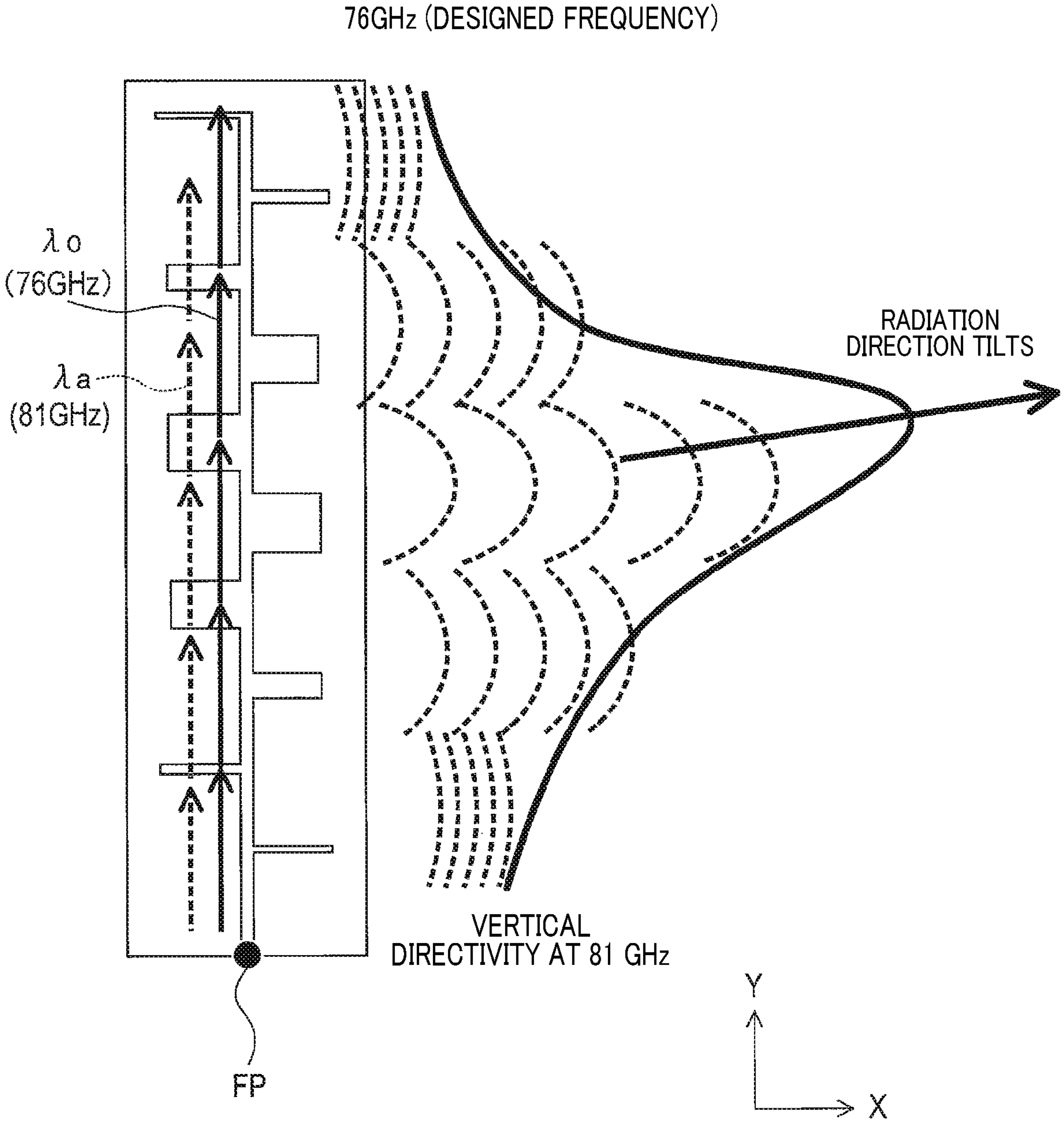
FIG. 12 is a diagram illustrating vertical directivity of the array antenna illustrated in FIG. 11 at a frequency different from the designed frequency.

As illustrated in FIGS. 11 and 12, in an array antenna including rectangular patch antennas, the radiation direction is forward at the designed frequency, and thus the gain is the largest at the vertical directivity in the forward direction. However, at 81 GHz deviating from the designed frequency, the power feeding phase is shifted, and thus the radiation direction tilts from the forward direction, and the gain is the largest with the vertical directivity shifted from the forward direction. As a result, the decrease of the antenna gains at frequencies at the band ends with respect to the antenna gain at the designed frequency becomes large. The vertical directivity refers to directivity in the YZ plane.

2-4. Advantageous Effects

According to the second embodiment described above, besides the above advantageous effects (1) and (2) of the first embodiment, the following advantageous effects can be obtained.

(3) The phase shifts Δθ in the phase of power feeding to the patch antennas 32 due to the frequency differences are larger with decreasing proximity to the feeding point FP. Thus, the patch antennas 32 are configured such that the patch antennas 32 closer to the feeding point FP have larger distance change amounts ΔD. Accordingly, the patch antennas 32 relatively close to the feeding point FP and having relatively small phase shifts Δθ have relatively small resonance position differences ΔP due to the frequency differences. On the other hand, the patch antennas 32 relatively distant from the feeding point FP and having relatively large phase shifts Δθ in the power feeding phase have relatively large resonance position differences ΔP due to the frequency differences. Thus, in the patch antennas 32, the phase shifts Δθ in the power feeding phase can be appropriately corrected by the resonance position differences ΔP, thereby suppressing a decrease in the gain of the array antenna 22 in a desired direction.

(4) The distance change amount ΔD can be more increased by making larger the non-parallel angle formed by the two non-parallel sides of the trapezoid of each patch antenna 32. Accordingly, by making the non-parallel angles larger in the patch antennas 32 closer to the feeding point FP, it is possible to appropriately correct the phase shifts Δθ in the power feeding phase by the resonance position differences ΔP in the patch antennas 32.

Third Embodiment

3-1. Differences from the Second Embodiment

A third embodiment is similar in basic components to the second embodiment, and thus description of the common components will be omitted and differences will be mainly described. The same reference signs as those in the second embodiment denote identical components, and thus preceding description will be referred to.

In the array antenna 22 of the second embodiment described above, the patch antennas 32 are connected to both the right and left sides of the transmission line 320. Differently from the second embodiment, an array antenna 23 of the third embodiment has patch antennas 33 connected to only the left side of a transmission line 330.

3-2. Configuration of Array Antenna

Figure 13:
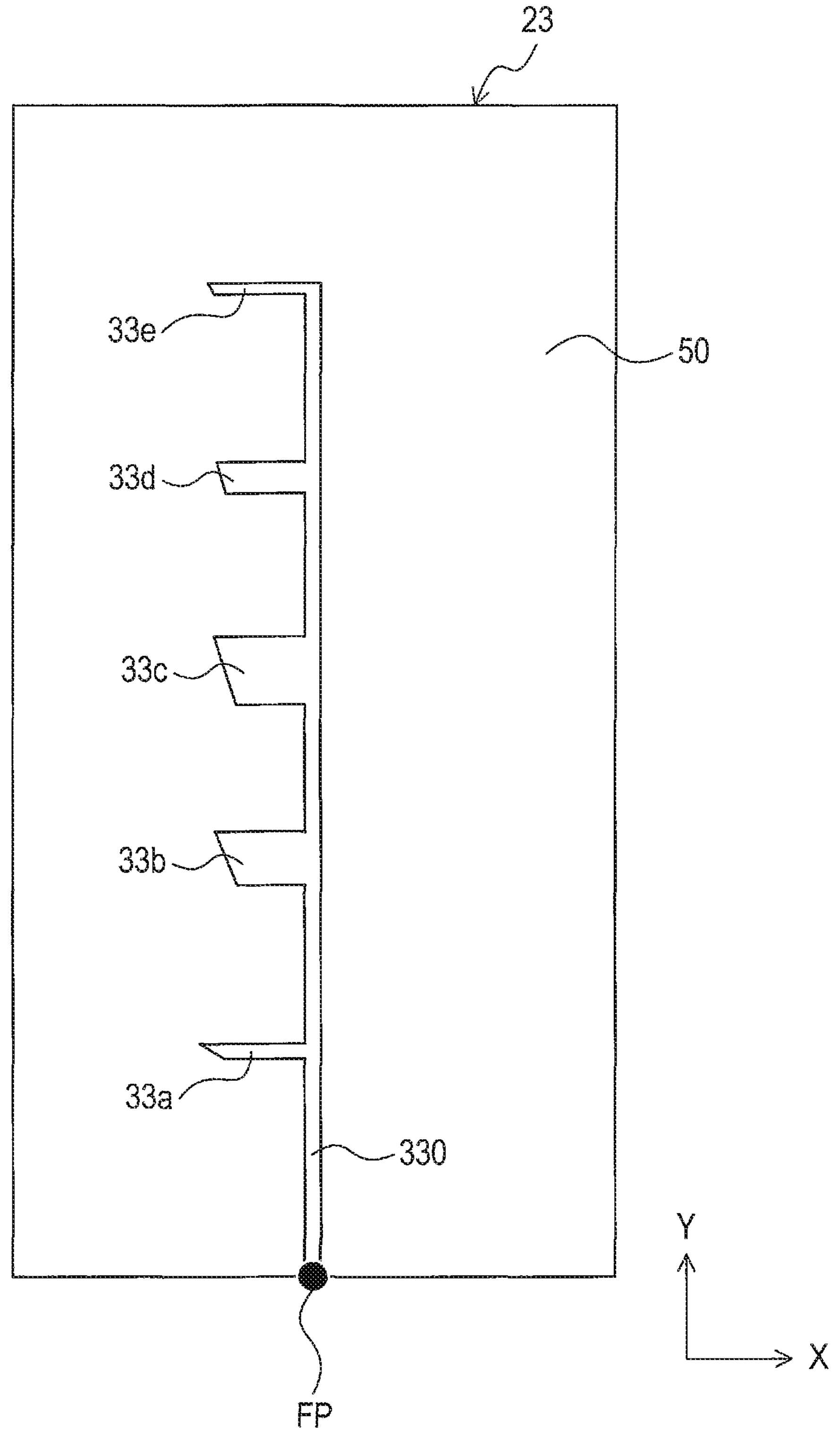
FIG. 13 is a plan view of a configuration of an array antenna according to a third embodiment.

As illustrated in FIG. 13, the array antenna 23 includes a multi-layer board 50. The multi-layer board 50 has five patch antennas 33*a*, 33*b*, 33*c*, 33*d*, and 33*e* and the transmission line 330 formed on a conductor pattern layer P1. Hereinafter, the patch antennas 33*a*, 33*b*, 33*c*, 33*d*, and 33*e* will be collectively called patch antennas 33.

The transmission line 330 is a microstrip line that transmits broadband high-frequency signals and extends in a Y-axis direction. The transmission line 330 connects the five patch antennas 33 in series.

In the present embodiment, since the five patch antennas 33 are connected to only one side of the transmission line 330, the five patch antennas are arranged at intervals of a designed wavelength λo such that the power feeding phases are equal at a designed frequency fo among the patch antennas 33. The five patch antennas 33 are arranged in order from the patch antenna 33*a*, from a feeding point FP provided at a first end toward a second end. In the present embodiment, the polarization angle formed by the polarization direction of a radiated radio wave and the transmission line 330 is set in advance to 90°.

Like the patch antennas 32, each patch antenna 33 is formed in a trapezoidal shape with a first side and a second side in parallel along the X-axis direction. The first side is the longest side of the patch antenna 33. The second side is closer to the feeding point FP than the first side. The patch angle formed by the first side, the second side, and the transmission line 330 is 90°. Accordingly, like the patch antennas 32, the patch antennas 33 are configured such that a high-frequency signal flows along the polarization direction of a radiated radio wave. In addition, each patch antenna 33 is configured such that the distance from the transmission line 330 to the end of the patch antenna 33 along the polarization direction of a radiated radio wave is shorter with increasing proximity to the feeding point FP.

The five patch antennas 33 are configured such that the middle patch antenna 33*c* is the largest in size to increase the directivity of the array antenna 23 in the forward direction. The patch antennas 33 are smaller in size in directions from the patch antenna 33*c* toward the first end and the second end.

Further, like the patch antennas 32, the patch antennas 33 are configured such that the non-parallel angle formed by the two non-parallel sides of the trapezoid is larger and the distance change amount ΔD is larger with increasing proximity to the feeding point FP.

According to the third embodiment described above, it is possible to produce advantageous effects similar to those of the second embodiment.

Fourth Embodiment

4-1. Differences from the Second Embodiment

A fourth embodiment is similar in basic components to the second embodiment, and thus description of the common components will be omitted and differences will be mainly described.

The same reference signs as those in the second embodiment denote identical components, and thus preceding description will be referred to.

In the array antenna 22 of the second embodiment described above, the patch antennas 32 are connected to the left or right side of the transmission line 320. Differently from the second embodiment, an array antenna 24 of the fourth embodiment has patch antennas 34 arranged so as to protrude toward the right and left sides of a transmission line 340 in the center.

4-2. Configuration of Array Antenna

Figure 14:
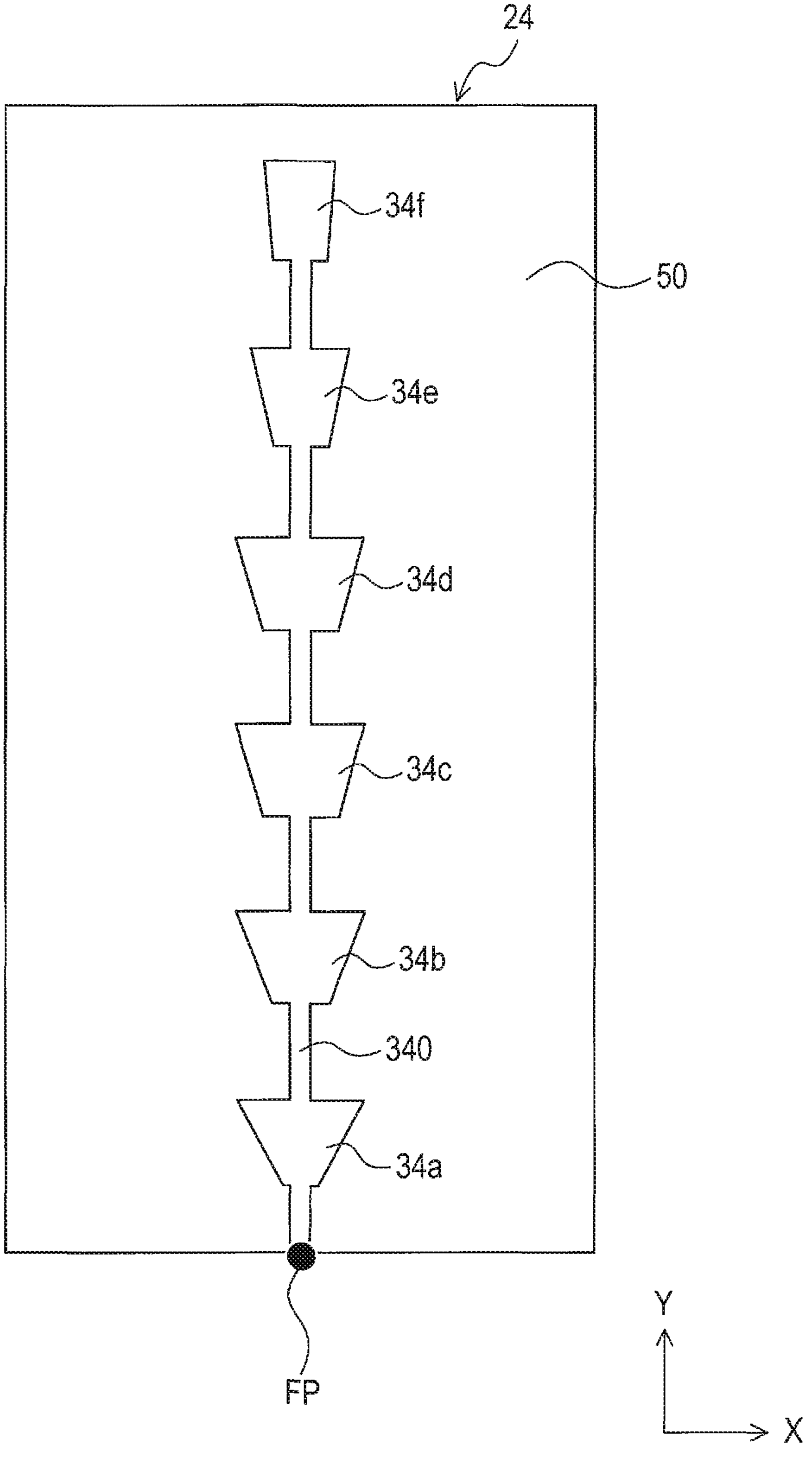
FIG. 14 is a plan view of a configuration of an array antenna according to a fourth embodiment.

As illustrated in FIG. 14, the array antenna 24 includes a multi-layer board 50. The multi-layer board 50 has six patch antennas 34*a*, 34*b*, 34*c*, 34*d*, 34*e*, and 34*f* and the transmission line 340 formed on a conductor pattern layer P1. Hereinafter, the patch antennas 34*a*, 34*b*, 34*c*, 34*d*, 34*e*, and 34*f* will be collectively called patch antennas 34.

The transmission line 340 is a microstrip line that transmits broadband high-frequency signals and extends in a Y-axis direction. The transmission line 340 connects the six patch antennas 34 in series.

The patch antennas 34 are formed in the shape of a bilaterally symmetrical trapezoid. The patch antennas 34 include the transmission line 340 in the middle as seen in an X-axis direction, and are arranged at intervals of a designed wavelength λo so as to be bilaterally symmetrical with respect to the transmission line 340. The six patch antennas 34 are arranged in order from the patch antenna 34*a*, from a feeding point FP at a first end toward a second end. In the present embodiment, the polarization angle formed by the polarization direction of a radiated radio wave and the transmission line 340 is set in advance to 90°.

Like the patch antennas 32, each patch antenna 34 has a first side and a second side in parallel along the X-axis direction. The first side is the longest side of the patch antenna 34. The second side is closer to the feeding point FP than the first side. The patch angle formed by the first side, the second side, and the transmission line 340 is 90°.

Accordingly, like the patch antennas 32, the patch antennas 34 are configured such that a high-frequency signal flows along the polarization direction of a radiated radio wave. In addition, each patch antenna 34 is configured such that the distance from the transmission line 340 to the left or right end of the patch antenna 34 along the polarization direction of a radiated radio wave is shorter with increasing proximity to the feeding point FP.

The six patch antennas 34 are configured such that the middle patch antennas 34*c* and 34*d* are the largest in size to increase the directivity of the array antenna 24 in the forward direction. The patch antennas 34 are smaller in size in directions from the patch antennas 34*c* and 34*d* toward the first end and the second end.

Further, like the patch antennas 32, the patch antennas 34 are configured such that the non-parallel angle formed by the two non-parallel sides of the trapezoid is larger and the distance change amount ΔD is larger with increasing proximity to the feeding point FP.

According to the fourth embodiment described above, it is possible to produce advantageous effects similar to those of the second embodiment and arrange the transmission line 340 passing through the middle parts of the patch antennas 34.

Fifth Embodiment

5-1. Differences from the Second Embodiment

A fifth embodiment is similar in basic components to the second embodiment, and thus description of the common components will be omitted and differences will be mainly described.

The same reference signs as those in the second embodiment denote identical components, and thus preceding description will be referred to.

In the array antenna 22 of the second embodiment described above, the feeding point FP is arranged at the first end of the transmission line 320. Differently from the second embodiment, an array antenna 25 of the fifth embodiment has a feeding point FP arranged in the middle of a transmission line 350.

5-2. Configuration of Array Antenna

Figure 15:
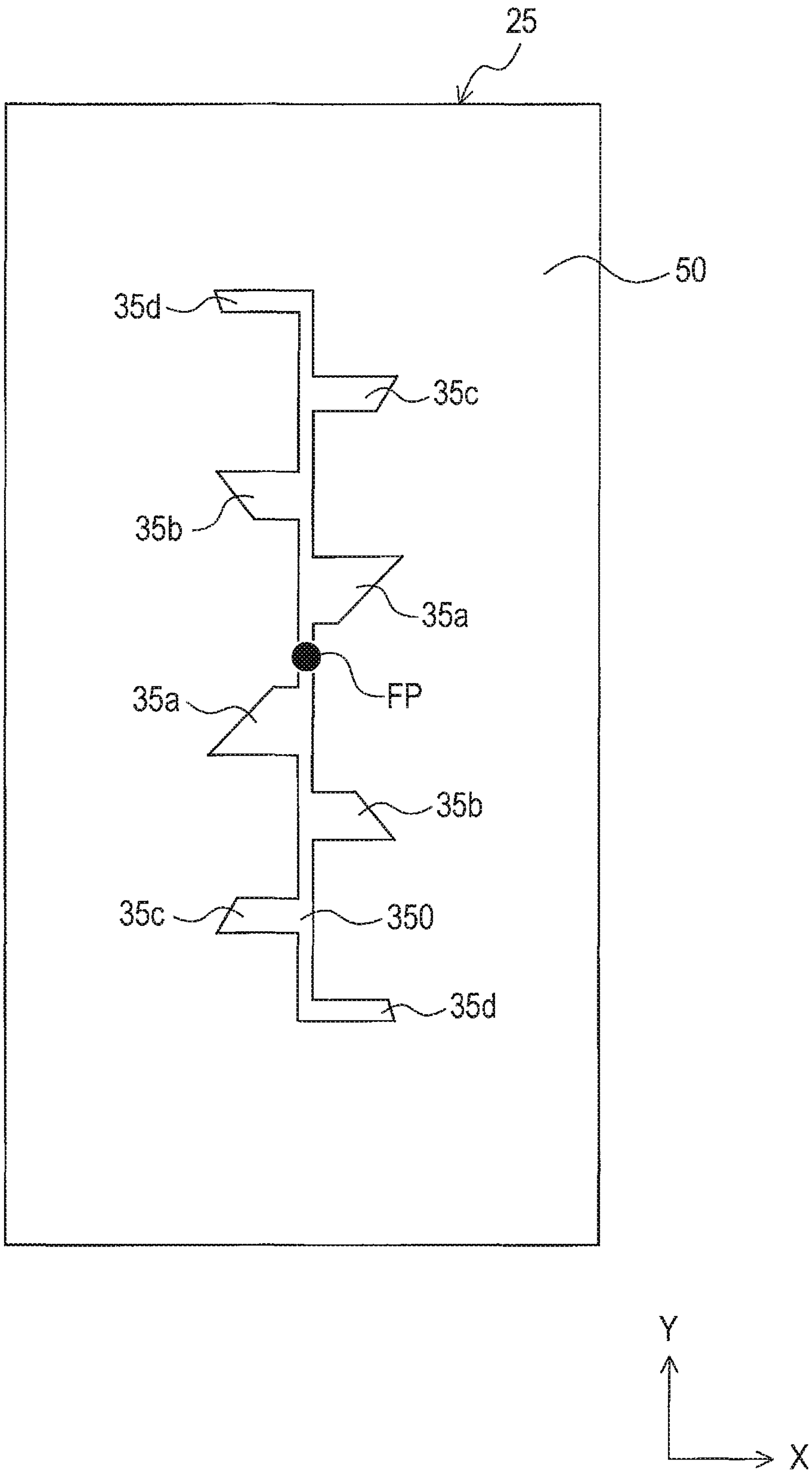
FIG. 15 is a plan view of a configuration of an array antenna according to a fifth embodiment.

As illustrated in FIG. 15, the array antenna 25 includes a multi-layer board 50. The multi-layer board 50 has two patch antennas 35*a*, two patch antennas 35*b*, two patch antennas 35*c*, two patch antennas 35*d*, and the transmission line 350 formed on a conductor pattern layer P1. That is, the two sets of patch antennas 35*a*, 35*b*, 35*c*, and 35*d*, and the transmission line 350 are formed on the conductor pattern layer P1. Hereinafter, the patch antennas 35*a*, 35*b*, 35*c*, and 35*d* will be collectively called patch antennas 35.

The transmission line 350 is a microstrip line that transmits broadband high-frequency signals and extends in a Y-axis direction. The transmission line 350 connects the eight patch antennas 35 in series.

The eight patch antennas 35 are arranged at intervals of ½ of a designed wavelength λo. More specifically, two sets of patch antennas 35*a*, 35*b*, 35*c*, and 35*d* are symmetric with respect to a feeding point FP. Each set of patch antennas 35*a*, 35*b*, 35*c*, and 35*d* is arranged away from the feeding point FP in order from the patch antenna 35*a*. In the present embodiment, the polarization angle formed by the polarization direction of a radiated radio wave and the transmission line 350 is set in advance to 90°.

A high-frequency signal supplied to the feeding point FP in the middle of the transmission line 350 is branched into two directions and flows into the sets of patch antennas 35*a*, 35*b*, 35*c*, and 35*d*, and is radiated from each of the eight patch antennas 35.

Like the patch antennas 32, each patch antenna 35 is formed in a trapezoidal shape with a first side and a second side in parallel along an X-axis direction. The first side is the longest side of the patch antenna 35. The second side is closer to the feeding point FP than the first side. The patch angle formed by the first side, the second side, and the transmission line 350 is 90°. Accordingly, like the patch antennas 32, the patch antennas 35 are configured such that a high-frequency signal flows along the polarization direction of a radiated radio wave. In addition, each patch antenna 35 is configured such that the distance from the transmission line 350 to an end of the patch antenna 33 along the polarization direction of a radiated radio wave is shorter with increasing proximity to the feeding point FP.

The eight patch antennas 35 are configured such that the middle patch antennas 35*a* are the largest in size to increase the directivity of the array antenna 25 in the forward direction. The patch antennas 35 are smaller in size in directions from the patch antennas 35*a* toward the patch antennas 35*d* at the both ends.

Further, like the patch antennas 32, the patch antennas 35 are configured such that the non-parallel angle formed by the two non-parallel sides of the trapezoid is larger and the distance change amount ΔD is larger with increasing proximity to the feeding point FP.

According to the fifth embodiment described above, it is possible to produce advantageous effects similar to those of the second embodiment and use the transmission line 350 with the feeding point FP arranged in the middle.

Sixth Embodiment

6-1. Differences from the Second Embodiment

A sixth embodiment is similar in basic components to the second embodiment, and thus description of the common components will be omitted and differences will be mainly described. The same reference signs as those in the second embodiment denote identical components, and thus preceding description will be referred to.

The array antenna 22 in the second embodiment has the feeding point FP arranged only at the first end, out of the first end and the second end of the transmission line 320. Differently from the second embodiment, an array antenna 26 of the sixth embodiment has a feeding point FP arranged at both a first end and a second end of a transmission line 360.

6-2. Configuration of Array Antenna

Figure 16:
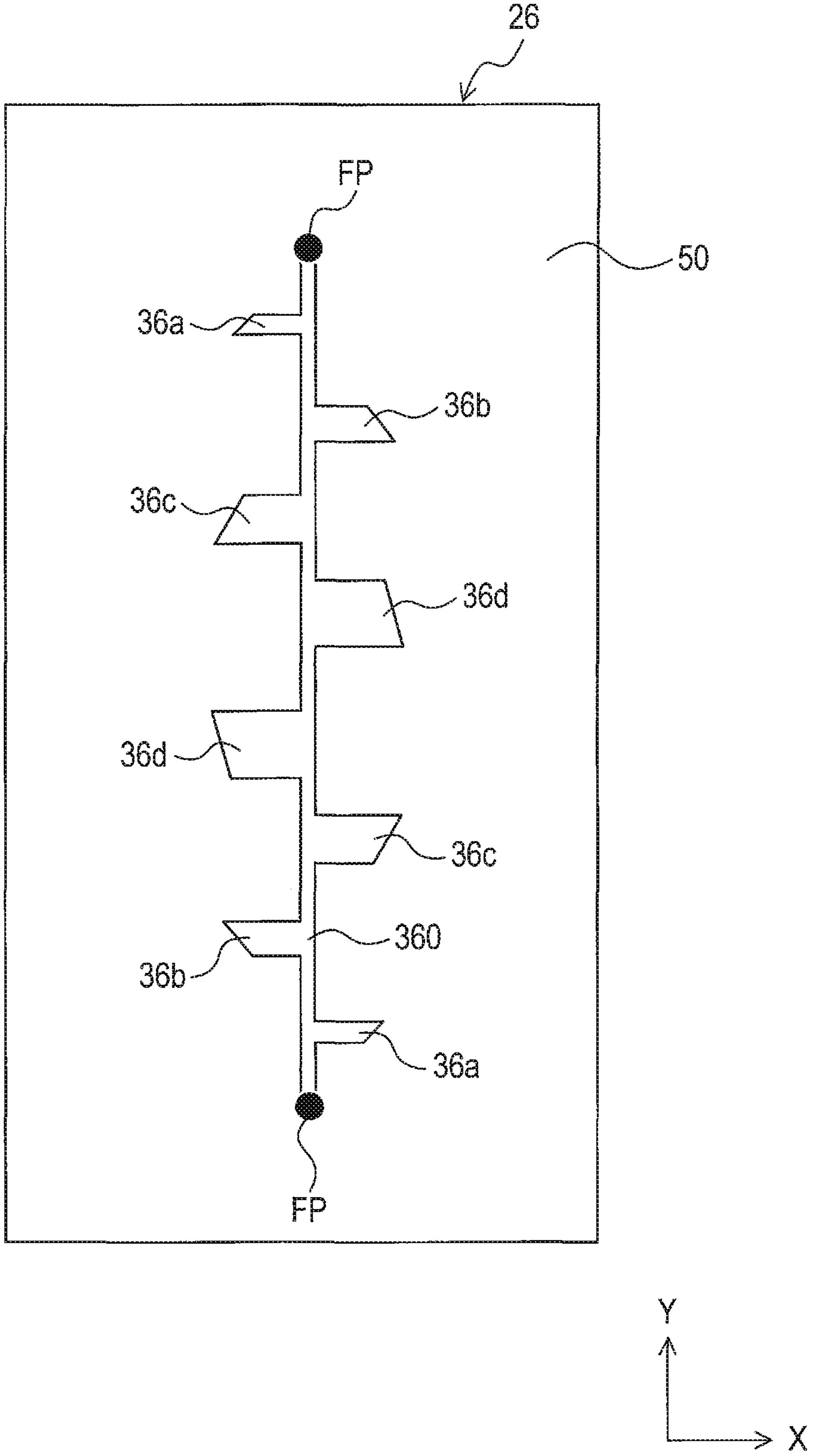
FIG. 16 is a plan view of a configuration of an array antenna according to a sixth embodiment.

As illustrated in FIG. 16, the array antenna 26 includes a multi-layer board 50. The multi-layer board 50 has two patch antennas 36*a*, two patch antennas 36*b*, two patch antennas 36*c*, two patch antennas 36*d*, and a transmission line 360 formed on a conductor pattern layer P1. That is, two sets of patch antennas 36*a*, 36*b*, 36*c*, and 36*d* and the transmission line 360 are formed on the conductor pattern layer P1. Hereinafter, the patch antennas 36*a*, 36*b*, 36*c*, and 36*d* will be collectively called patch antennas 36.

The transmission line 360 is a microstrip line that transmits broadband high-frequency signals and extends in a Y-axis direction. The transmission line 360 connects the eight patch antennas 36 in series.

The eight patch antennas 36 are arranged at intervals of ½ of a designed wavelength λo. More specifically, two sets of patch antennas 36*a*, 36*b*, 36*c*, and 36*d* are symmetric with respect to the middle of the transmission line 360. Each set of patch antennas 36*a*, 36*b*, 36*c*, and 36*d* is arranged away from the corresponding feeding point FP in order from the patch antenna 36*a*. In the present embodiment, the polarization angle formed by the polarization direction of a radiated radio wave and the transmission line 360 is set in advance to 90°.

The high-frequency signal supplied to the first feeding point FP of the transmission line 360 flows through the first set of patch antennas 36*a*, 36*b*, 36*c*, and 36*d* toward the second feeding point FP, and is radiated from each patch antenna 36. In addition, the high-frequency signal supplied to the second feeding point FP of the transmission line 360 flows through the second set of patch antennas 36*a*, 36*b*, 36*c*, and 36*d* toward the first feeding point FP, and is radiated from each patch antenna 36.

Like the patch antennas 32, each patch antenna 36 is formed in a trapezoidal shape with a first side and a second side in parallel along an X-axis direction. The first side is the longest side of the patch antenna 36. The second side is closer to the feeding point FP than the first side. The patch angle formed by the first side, the second side, and the transmission line 360 is 90°. Accordingly, like the patch antennas 32, the patch antennas 36 are configured such that a high-frequency signal flows along the polarization direction of a radiated radio wave. In addition, each patch antenna 36 is configured such that the distance from the transmission line 360 to the end of the patch antenna 36 is shorter with increasing proximity to the feeding point FP.

The eight patch antennas 36 are configured such that the two middle patch antennas 36*d* are the largest in size to increase the directivity of the array antenna 25 in the forward direction. The patch antennas 36 are smaller in size in directions from the patch antennas 36*d* toward the patch antennas 36*a* at the both ends.

Further, like the patch antennas 32, the patch antennas 36 are configured such that the non-parallel angle formed by the two non-parallel sides of the trapezoid is larger and the distance change amount ΔD is larger with increasing proximity to the feeding point FP.

According to the sixth embodiment described above, it is possible to produce advantageous effects similar to those of the second embodiment and use the transmission line 360 with the feeding point FP arranged at both sides.

Seventh Embodiment

7-1. Difference from the Second Embodiment

A seventh embodiment is similar in basic components to the second embodiment, and thus description of the common components will be omitted and differences will be mainly described.

The same reference signs as those in the second embodiment denote identical components, and thus preceding description will be referred to.

The patch antennas 32 of the second embodiment described above are formed in trapezoidal shapes. Differently from the second embodiment, patch antennas 37 of the seventh embodiment are formed in shapes with a curved end.

7-2. Configuration of Array Antenna

Figure 17:
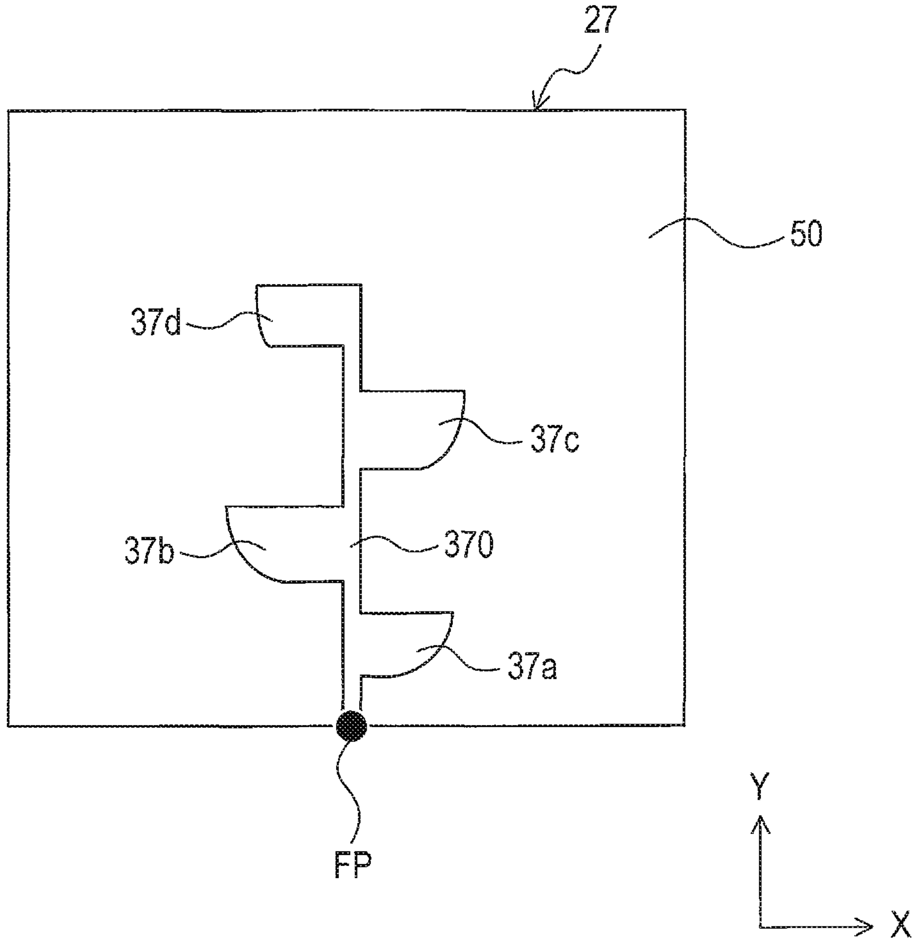
FIG. 17 is a plan view of a configuration of an array antenna according to a seventh embodiment.

As illustrated in FIG. 17, an array antenna 27 in the present embodiment includes a multi-layer board 50. The multi-layer board 50 has patch antennas 37*a*, 37*b*, 37*c*, and 37*d*, and a transmission line 370 formed on a conductor pattern layer P1. Hereinafter, the patch antennas 37*a*, 37*b*, 37*c*, and 37*d* will be collectively called patch antennas 37.

The transmission line 370 is a microstrip line that transmits broadband high-frequency signals and extends in a Y-axis direction. The transmission line 370 connects the four patch antennas 37 in series.

The four patch antennas 37 are connected to the transmission line 370 alternately to right and left sides at intervals of ½ of a designed wavelength λo. In addition, the four patch antennas 37 are arranged in order from the patch antenna 37*a*, from a feeding point FP at a first end toward a second end. In the present embodiment, the polarization angle formed by the polarization direction of a radiated radio wave and the transmission line 370 is set in advance to 90°.

Each patch antenna has a first side and a second side in parallel along an X-axis direction, a third side running along the Y-axis direction and connected to the transmission line 370, and a curved end facing the third side and connecting the first side and the second side.

The first side is the longest side of the patch antenna 37. The second side is closer to the feeding point FP than the first side. The patch angle formed by the first side, the second side, and the transmission line 370 is 90°. Accordingly, like the patch antennas 32, the patch antennas 37 are configured such that a high-frequency signal flows along the polarization direction of a radiated radio wave.

Each patch antenna 37 is configured such that the distance from the transmission line 370 to the curved end of the patch antenna 37 is shorter with increasing proximity to the feeding point FP.

The four patch antennas 37 are configured such that the middle patch antennas 37*b* and 37*c* are made larger than the patch antennas 37*a* and 37*d* at the ends to increase the directivity of the array antenna 27 in the forward direction.

Further, like the patch antennas 32, the patch antennas 37 are configured such that the distance change amount ΔD is larger with increasing proximity to the feeding point FP. Therefore, the patch antennas 37 are configured to be closer to a triangular shape with increasing proximity to the feeding point FP and to be closer to a square shape with decreasing proximity to the feeding point FP.

According to the seventh embodiment described above, it is possible to produce advantageous effects similar to those of the second embodiment. In addition, it is possible to use the patch antennas 37 formed in the shapes with curved ends because the distances along the polarization direction can be changed by the curved ends.

Eighth Embodiment

8-1. Differences from the Fourth Embodiment

An eighth embodiment is similar in basic components to the fourth embodiment, and thus description of the common components will be omitted and differences will be mainly described. The same reference signs as those in the fourth embodiment denote identical components, and thus preceding description will be referred to.

The patch antennas 34 in the fourth embodiment described above are formed in trapezoidal shapes. Differently from the fourth embodiment, patch antennas 38 in the eighth embodiment are formed in substantially semi-circular shapes with curved ends.

8-2. Configuration of Array Antenna

Figure 18:
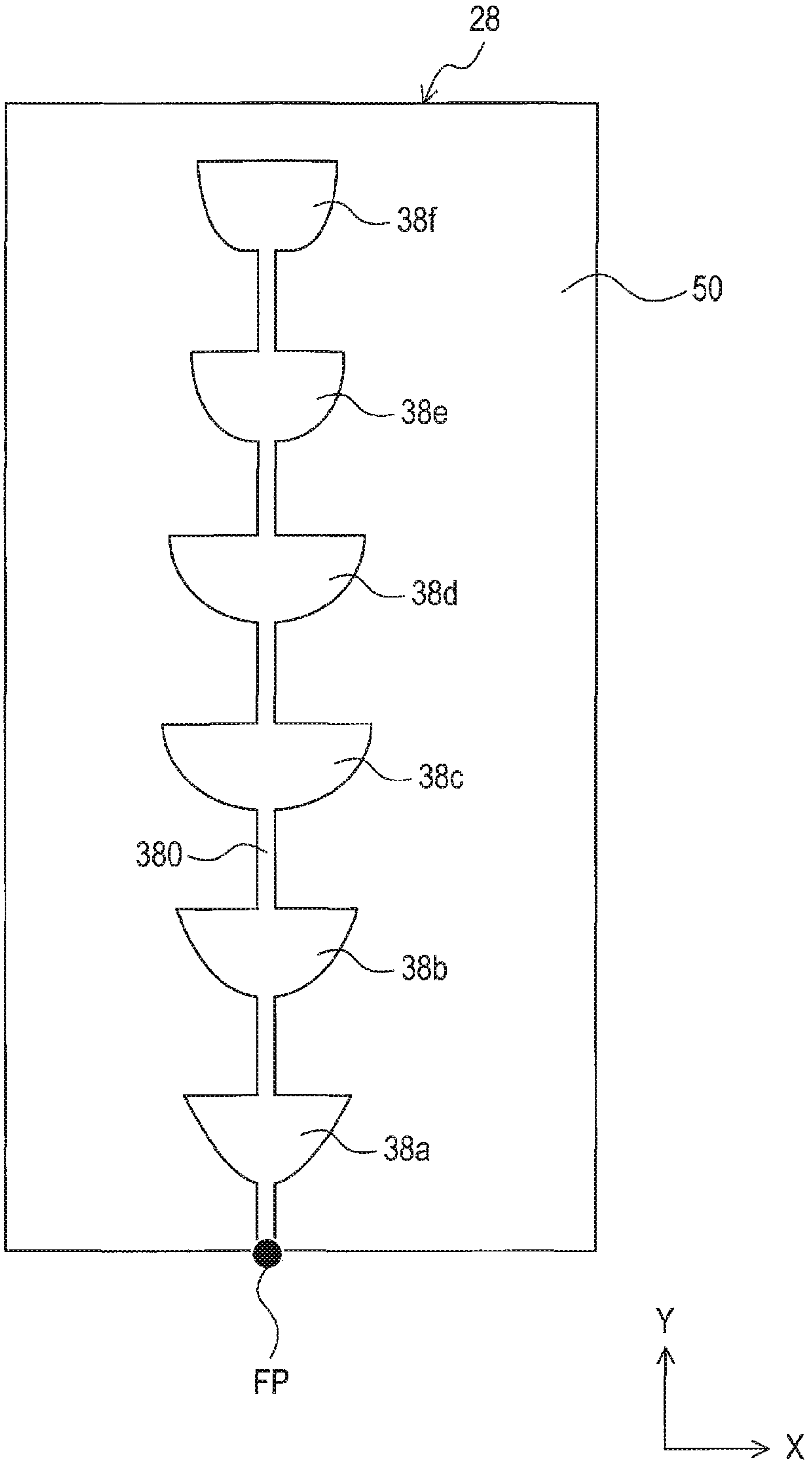
FIG. 18 is a plan view of a configuration of an array antenna according to an eighth embodiment.

As illustrated in FIG. 18, an array antenna 28 according to the eight embodiment includes a multi-layer board 50. The multi-layer board 50 has six patch antennas 38*a*, 38*b*, 38*c*, 38*d*, 38*e*, and 38*f*, and a transmission line 380 formed on a conductor pattern layer P1. Hereinafter, the patch antennas 38*a*, 38*b*, 38*c*, 38*d*, 38*e*, and 38*f* will be collectively called patch antennas 38.

The transmission line 380 is a microstrip line that transmits broadband high-frequency signals and extends in a Y-axis direction. The transmission line 380 connects the six patch antennas 38 in series.

The patch antennas 38 are formed in substantially semi-circular shapes that are bilaterally symmetrical. The patch antennas 38 include the transmission line 380 in the middle as seen in an X-axis direction, and are arranged at intervals of a designed wavelength λo so as to be bilaterally symmetrical with respect to the transmission line 380. The six patch antennas 38 are arranged in order from the patch antenna 38*a*, from a feeding point FP at a first end toward a second end. In the present embodiment, the polarization angle formed by the polarization direction of a radiated radio wave and the transmission line 380 is set in advance to 90°.

Each patch antenna 38 has a patch side along the X-axis direction and a curved end opposing to the patch side. The patch angle formed by the patch side and the transmission line 380 is 90°. Accordingly, the patch antennas 38 are configured such that a high-frequency signal flows along the patch side, that is, along the polarization direction of a radiated radio wave.

In addition, each patch antenna 38 is configured such that the distance from the transmission line 380 to the left or right end of the curved end along the polarization direction of a radiated radio wave is shorter with increasing proximity to the feeding point FP.

The eight patch antennas 38 are configured such that the middle patch antennas 38*c* and 38*d* are the largest in size to increase the directivity of the array antenna 28 in the forward direction. The patch antennas 38 are smaller in size in directions from the patch antennas 38*c* and 38*d* toward the first end and the second end.

Further, like the patch antennas 34, the patch antennas 38 are configured such that the distance change amount ΔD is larger with increasing proximity to the feeding point FP. Therefore, the patch antennas 38 are configured to be closer to a triangular shape with increasing proximity to the feeding point FP and to be closer to a square shape with decreasing proximity to the feeding point FP.

According to the eighth embodiment described above, it is possible to produce advantageous effects similar to those of the fourth embodiment. In addition, it is possible to use the patch antennas 38 formed in the shapes with curved ends because the distances along the polarization direction can be changed by the curved ends.

Ninth Embodiment 9-1. Differences from the Second Embodiment

A ninth embodiment is similar in basic components to the second embodiment, and thus description of the common components will be omitted and differences will be mainly described. The same reference signs as those in the second embodiment denote identical components, and thus preceding description will be referred to.

In the array antenna 22 of the second embodiment described above, the polarization angle formed by the polarization direction of a radiated radio wave and the transmission line 320 is set in advance to 90°. In addition, each patch antenna 32 is formed such that the patch angle formed by the longest side and the transmission line 320 is 90°. In contrast to this, in an array antenna 29 of the ninth embodiment, the polarization angle formed by the polarization direction of a radiated radio wave and a transmission line 390 is set in advance to α. In addition, differently from the second embodiment, each patch antenna 39 is configured such that the patch angle formed by the longest side and the transmission line 390 is α. The value of α is larger than 0° and smaller than 90°.

9-2. Configuration of Array Antenna

Figure 19:
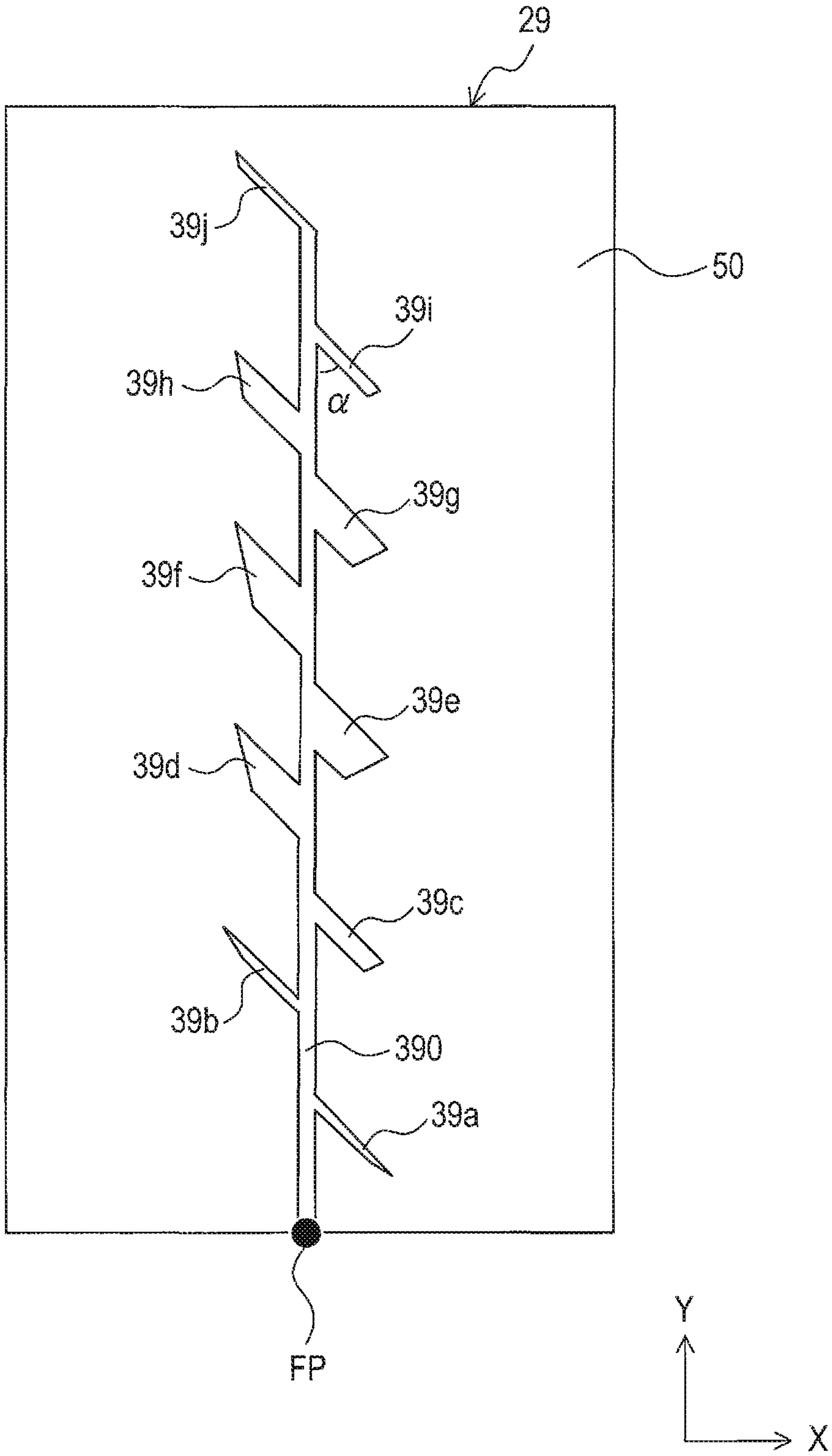
FIG. 19 is a plan view of a configuration of an array antenna according to a ninth embodiment.

As illustrated in FIG. 19, the array antenna 29 includes a multi-layer board 50. The multi-layer board 50 has ten patch antennas 39*a*, 39*b*, 39*c*, 39*d*, 39*e*, 39*f*, 39*g*, 39*h*, 39*i*, and 39*j*, and the transmission line 390 formed on a conductor pattern layer P1. Hereinafter, the patch antennas 39*a*, 39*b*, 39*c*, 39*d*, 39*e*, 39*f*, 39*g*, 39*h*, 39*i*, and 39*j* will be collectively called patch antennas 39.

The transmission line 390 is a microstrip line that transmits broadband high-frequency signals and extends in a Y-axis direction. The transmission line 390 connects the ten patch antennas 39 in series.

The ten patch antennas 39 are alternately arranged to right and left with respect to the transmission line 390 at intervals of ½ of a designed wavelength λo in order from the patch antenna 39*a*, from a feeding point FP at a first end toward a second end.

Each patch antenna 39 is formed in a trapezoidal shape with a first side and a second side in parallel along the X-axis direction. The first side is the longest side of the patch antenna 39. The second side is closer to the feeding point FP than the first side. The patch angle formed by the first side, the second side, and the transmission line 390 is α. Accordingly, the patch antennas 39 are configured such that a high-frequency signal flows along the first side, that is, along the polarization direction of a radiated radio wave. In addition, like the patch antennas 32, each patch antenna 39 is configured such that the distance from the transmission line 390 to the end of the patch antenna 39 along the polarization direction of a radiated radio wave is shorter with increasing proximity to the feeding point FP.

The ten patch antennas 39 are configured such that the middle patch antennas 39*e* and 39*f* are the largest in size to increase the directivity of the array antenna 29 in the forward direction. The patch antennas 39 are smaller in size in directions from the patch antennas 39*e* and 39*f* toward the first end and the second end.

Further, like the patch antennas 32, each patch antenna 39 is configured such that the non-parallel angle formed by the two non-parallel sides of the trapezoid is larger and the distance change amount ΔD is larger with increasing proximity to the feeding point FP.

According to the ninth embodiment, it is possible to produce advantageous effects similar to those of the fourth embodiment. In addition, it is possible to set the polarization direction of a radiated radio wave to various directions in accordance with the angle α formed by each patch antenna 39 and the transmission line 390.

Tenth Embodiment

10-1. Differences from the First Embodiment

A tenth embodiment is similar in basic components to the first to ninth embodiments, and thus description of the common components will be omitted and differences will be mainly described. The same reference signs as those in the first to ninth embodiments denote identical components, and thus preceding descriptions will be referred to.

The multi-layer boards 50 in the first to ninth embodiments have a single dielectric layer L1. Differently from the first embodiment, a multi-layer board 50A in the tenth embodiment has a plurality of dielectric layers L1, L2, L3, and L4.

10-2. Configuration of Array Antenna

Figure 20:
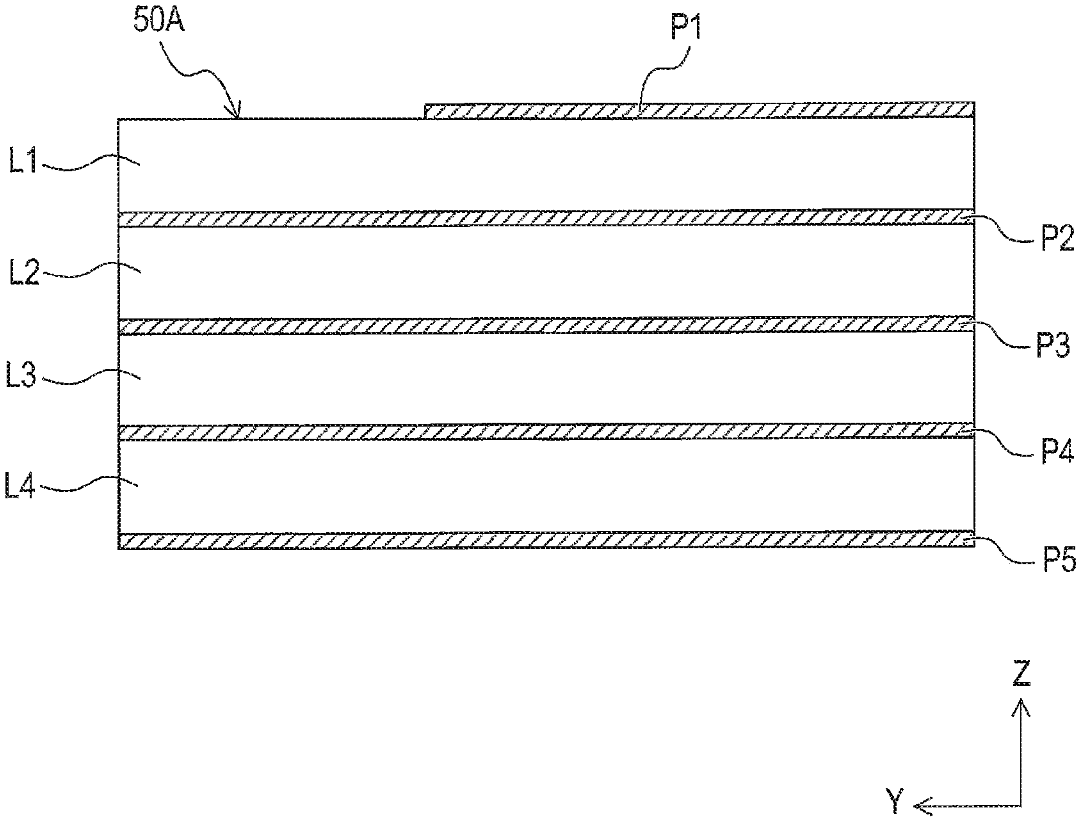
FIG. 20 is a cross-sectional view of a configuration of an array antenna according to a tenth embodiment.

As illustrated in FIG. 20, the multi-layer board 50A has the four dielectric layers L1, L2, L3, and L4 and five conductor pattern layers P1, P2, P3, P4, and P5, and the conductor pattern layers and the dielectric layers are alternately laminated. Specifically, the conductor pattern layers and the dielectric layer are laminated in order of P1, L1, P2, L2, P3, L3, P4, L4, and P5.

Any of array antennas 21 to 29 is formed on the conductor pattern layer P1 that is the outer layer among the five conductor pattern layers P1, P2, P3, P4, and P5.

According to the tenth embodiment described above, it is possible to produce advantageous effects similar to those of any of the first to ninth embodiments in accordance with any of the array antennas 21 to 29 formed on the conductor pattern layer P1.

Eleventh Embodiment

11-1. Differences from the First Embodiment

An eleventh embodiment is similar in basic components to the first to ninth embodiments, and thus description of the common components will be omitted and differences will be mainly described. The same reference signs as those in the first to ninth embodiments denote identical components, and thus preceding descriptions will be referred to.

In the multi-layer boards 50 of the first to ninth embodiments, the conductor pattern layer P1 on which any of the array antennas 21 to 29 is formed is the outer layer arranged on the outer surface of the multi-layer board 50. Differently from the first embodiment, in the multi-layer board 50B of the eleventh embodiment, a conductor pattern layer P1 on which any of the array antennas 21 to 29 is formed is an inner layer of the multi-layer board 50B.

11-2. Configuration of Array Antenna

Figure 21:
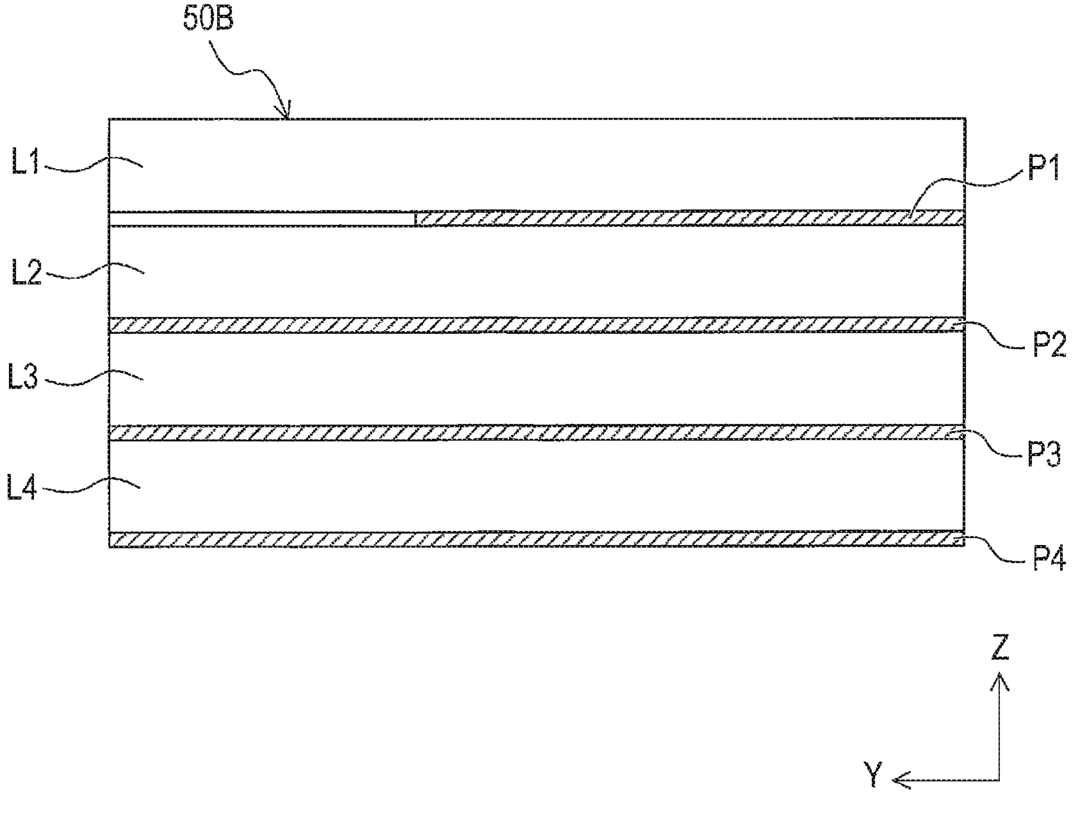
FIG. 21 is a cross-sectional view of a configuration of an array antenna according to an eleventh embodiment.

As illustrated in FIG. 21, the multi-layer board 50B has four dielectric layers L1, L2, L3, and L4 and four conductor pattern layers P1, P2, P3, and P4, and the conductor pattern layers and the dielectric layers are alternately laminated. Specifically, the conductor pattern layers and the dielectric layer are laminated in order of L1, P1, L2, P2, L3, P3, L4, and P4.

Any of the array antennas 21 to 29 is formed on the conductor pattern layer P1 that is an inner layer interposed between the dielectric layer L1 and the dielectric layer L2.

According to the eleventh embodiment described above, it is possible to produce advantageous effects similar to those of any of the first to ninth embodiments in accordance with any of the array antennas 21 to 29 formed on the conductor pattern layer P1.

Twelfth Embodiment

12-1. Differences from the First Embodiment

A twelfth embodiment is similar in basic components to the first to ninth embodiments, and thus description of the common components will be omitted and differences will be mainly described. The same reference signs as those in the first to ninth embodiments denote identical components, and thus preceding description will be referred to.

The multi-layer boards 50 in the first to ninth embodiments have any of the array antennas 21 to 29 formed on one conductor pattern layer P1. Differently from the first embodiment, a multi-layer board 50C of the twelfth embodiment has any of array antennas 21 to 29 formed on a plurality of conductor pattern layers P1 and P2.

10-2. Configuration of Array Antenna

Figure 22:
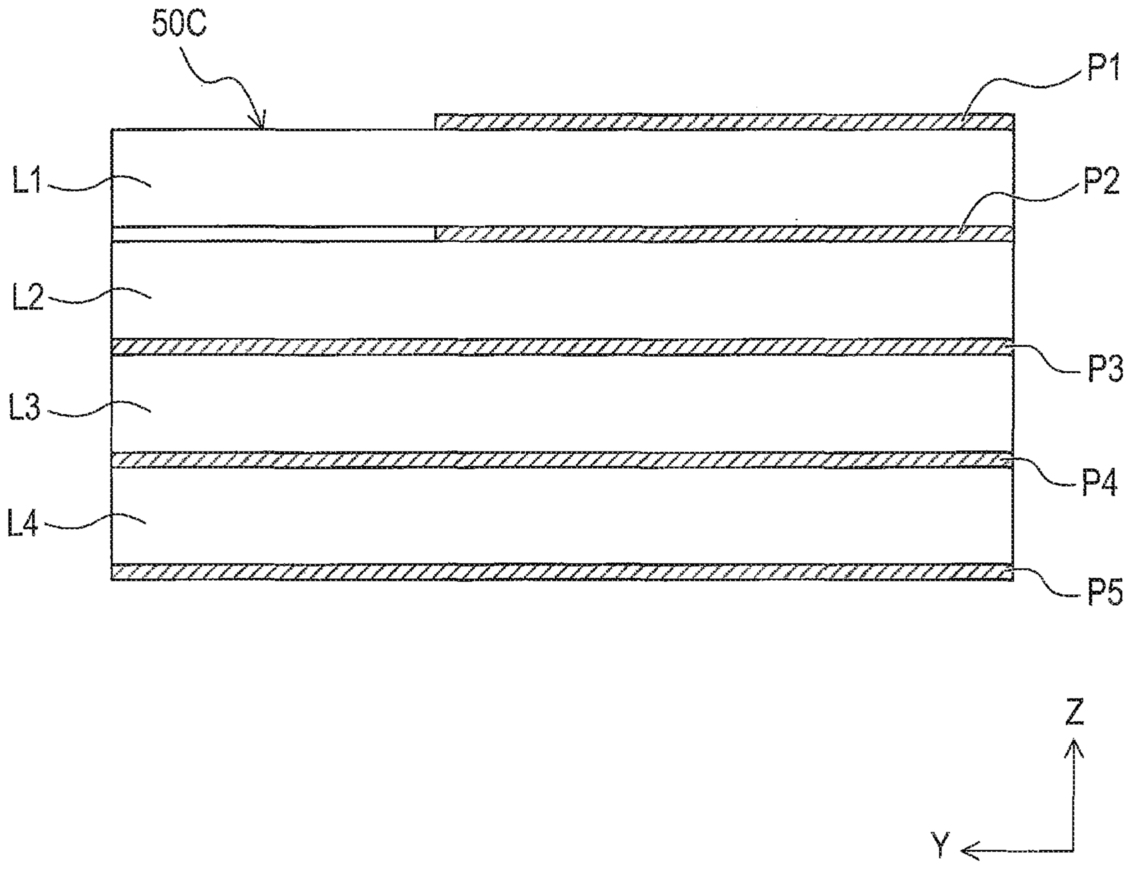
FIG. 22 is a cross-sectional view of a configuration of an array antenna according to a twelfth embodiment.

As illustrated in FIG. 22, the multi-layer board 50C has four dielectric layers L1, L2, L3, and L4 and five conductor pattern layers P1, P2, P3, P4, and P5, and the conductor pattern layers and the dielectric layers are alternately laminated. Specifically, the conductor pattern layers and the dielectric layers are laminated in order of P1, L1, P2, L2, P3, L3, P4, L4, and P5.

Any of the array antennas 21 to 29 is formed on each of a conductor pattern layer P1 that is the outer layer among the five conductor pattern layers P1, P2, P3, P4, and P5 and a conductor pattern layer P2 that is an inner layer among the five conductor pattern layers P1, P2, P3, P4, and P5.

According to the twelfth embodiment described above, it is possible to produce advantageous effects similar to those of any of the first to ninth embodiments, in accordance with any of the array antennas 21 to 29 formed on the conductor pattern layers P1 and P2.

Other Embodiments

As above, the embodiments for carrying out the present disclosure have been described. However, the present disclosure is not limited to the embodiments described above but can be modified in various manners.

(a) The configurations of the array antennas are not limited to those in the above embodiments. For example, in the second to ninth embodiments, the array antennas 22 to 29 may not be provided with directivity and the patch antennas 32 to 39 in the array antennas 22 to 29 may be formed in the same size. In the second to ninth embodiments, the directivity of the array antennas 22 to 29 may be set to a direction other than the forward direction. In the third to eighth embodiments, as in the ninth embodiment, the angles α formed by the longest sides of the patch antennas 33 to 38 and the transmission lines 330 to 380 may be smaller than 90°.

(b) A plurality of functions possessed by one component in the above embodiments may be implemented by a plurality of components, and one function possessed by one component may be implemented by a plurality of components. A plurality of functions possessed by a plurality of components may be implemented by one component, and one function possessed by a plurality of components may be implemented by one component. Some of the components in the above embodiments may be omitted. At least some of the components in any of the above embodiments may be added to or replaced by the components in any other of the above embodiments.

What is claimed is:

1. A broadband planar array antenna comprising:

a multi-layer board that has dielectric layers and conductor pattern layers alternately laminated;

a plurality of patch antenna patterns that is provided on at least one of the conductor pattern layers and that is configured to radiate radio waves; and a transmission line that connects the plurality of patch antenna patterns in series, wherein:

a polarization direction of the radiated radio waves is perpendicular to a longitudinal center of the transmission line; and each of the plurality of patch antenna patterns is symmetrically disposed on both sides of the longitudinal center and is configured such that a distance from the longitudinal center of the transmission line to an end of each of the plurality of patch antenna patterns along the polarization direction is shorter with increasing proximity to a feeding point of the transmission line.

2. The broadband planar array antenna according to claim 1, wherein each of the plurality of patch antenna patterns is configured such that a change amount of the distance in each of the plurality of patch antenna patterns is larger with increasing proximity to the feeding point.

3. The broadband planar array antenna according to claim 1, wherein a patch angle formed by a longest side of each of the plurality of patch antenna patterns and the transmission line is 90°.

4. The broadband planar array antenna according to claim 1, wherein each of the plurality of patch antenna patterns is formed in a trapezoidal shape with two sides in parallel along the polarization direction.

5. The broadband planar array antenna according to claim 4, wherein each of the plurality of patch antenna patterns is configured such that a non-parallel angle formed by two non-parallel sides of the trapezoidal shape is larger with increasing proximity to the feeding point.

6. The broadband planar array antenna according to claim 1, wherein each of the plurality of patch antenna patterns is formed in a shape with the end curved.

* * * * *